United States Patent [19]
Martinez et al.

[11] Patent Number: 5,319,358
[45] Date of Patent: Jun. 7, 1994

[54] METHOD AND APPARATUS FOR MINIMIZING THE VISUAL DEGRADATION OF DIGITAL TYPEFACES

[75] Inventors: Eduardo Martinez, Palo Alto; May Kao, Cupertino, both of Calif.

[73] Assignee: Sun Microsystems, Inc., Mountain View, Calif.

[21] Appl. No.: 850,245

[22] Filed: Mar. 11, 1992

Related U.S. Application Data

[63] Continuation of Ser. No. 263,043, Oct. 26, 1988, abandoned.

[51] Int. Cl.⁵ .............................................. G09G 5/26
[52] U.S. Cl. .................................... 345/141; 345/10; 395/151
[58] Field of Search ............... 340/748, 731, 735, 790, 340/751; 382/16, 19, 22, 23, 25, 47; 364/518, 521; 395/102, 110, 139, 150, 151

[56] References Cited

U.S. PATENT DOCUMENTS

| | | | |
|---|---|---|---|
| 4,231,096 | 10/1980 | Hansen et al. | 340/748 |
| 4,338,673 | 7/1982 | Brown | 340/748 |
| 4,345,245 | 8/1982 | Vella et al. | 340/748 |
| 4,674,059 | 6/1987 | Schrieber | 340/748 |
| 4,675,830 | 6/1987 | Hawkins | 364/523 |
| 4,680,578 | 7/1987 | Horning et al. | 340/748 |
| 4,748,443 | 5/1988 | Uehara et al. | 340/731 |
| 4,833,627 | 5/1989 | Leszezynski | 364/518 |
| 4,897,638 | 1/1990 | Kokunishi et al. | 340/731 |

*Primary Examiner*—Jeffery Brier
*Attorney, Agent, or Firm*—Blakely Sokoloff Taylor & Zafman

[57] ABSTRACT

A method and apparatus for minimizing the visual degradation of a typeface wherein the need for the manual input of skilled technicians is eliminated and the important visual components of each character and the relationship of the visual components of each character with the other characters of the typeface are preserved. The characters are analyzed to determine the visual components in the horizontal and vertical direction which comprise each character and the priority of adjustment. Using the visual components determined, starting with the highest priority component, the coordinates describing each character are adjusted according to rules which are dependent upon whether the strokes formed are oriented in the horizontal or vertical direction. The adjustment of the lower priority visual components is dependent on the previously aligned components. The important visual components in the diagonal direction are subsequently adjusted in accordance with similar sized visual components in the horizontal and vertical direction wherein the dimensions of the adjusted horizontal and vertical components are maintained.

8 Claims, 27 Drawing Sheets

METHOD AND APPARATUS FOR MINIMIZING THE VISUAL DEGRADATION OF DIGITAL TYPEFACES

This is a file wrapper continuation application of U.S. patent application Ser. No. 07/263,043, filed on Oct. 26, 1988, entitled Method and Apparatus for Minimizing Visual Degradation of Digital Typeface now abandoned.

In addition to the parent application, this application is also related to the following divisional applications of the parent application:

a. U.S. patent application Ser. No. 07/846,213, filed on Mar. 4, 1992, entitled Method and Apparatus for Minimizing Visual Degradation of Digital Typeface—Character Analysis;

b. U.S. patent application Ser. No. 07/846,781, filed on Mar. 4, 1992, entitled Method and Apparatus for Minimizing Visual Degradation of Digital Typeface—Horizontal Adjustment;

c. U.S. patent application Ser. No. 07/846,586, filed on Mar. 5, 1992, entitled Method and Apparatus for Minimizing Visual Degradation of Digital Typeface—Vertical Adjustment;

d. U.S. patent application Ser. No. 07/846,584, filed on Mar. 5, 1992, entitled Method and Apparatus for Minimizing Visual Degradation of Digital Typeface—Diagonal Adjustment.

FIELD OF THE INVENTION

The method and apparatus of the present invention relates to the technique of intelligent scaling. More particularly, the present invention relates to data processing apparatus and methods for minimizing the visual degradation of digital typefaces.

ART BACKGROUND

As the popularity and affordability of computers have increased, so has the number of computer programs available. The computer programs available are diverse, encompassing a wide variety of applications. In addition, the range of users has broadened from the computer programmer of 10 years ago to businesses that use the computer for a variety of tasks including word processing and accounting.

It is well understood from the nature of digital representations of continuous analog forms that some degradation will occur when translating from a continuous representation (such as a typeface prepared manually by a calligrapher) to a discrete digital representation. Programmers and engineers, the original users of computers and viewers of digital typefaces generated by computers (typically on CRT's and computer printers) were not concerned about how the type looked so long as the characters were somewhat readable. However, not only has the viewer of digital type changed but also the requirements with respect to legibility and degradation of type.

As a result, the ability to provide legible digital typefaces has become extremely important for the automation of the printing and typesetting industry as well as for word processor users who require legible, letter quality type. For further information on digital typefaces, see: Bigelow & Day, "Digital Typography", *Scientific American*, p. 106–119, August, 1983; Karow, *Digital Formats For Typefaces*, (URW Verlag 1987).

Typically, to produce a digital typeface, the typeface is developed manually, digitized and input into a digital typeface format such as IKARUS. Problems arise because the control points of the character which define the outline of the character do not always coincide to the discrete grid positions corresponding to the resolution of the digital display or printer. As a result, the control points are rounded off to the nearest grid position and parts of characters which originally had the same dimension (for example the widths of the vertical portions of an upper case "I" and "J") now have different dimensions. This method results in the visual degradation of the typeface because the reader does not easily see and recognize the characters with the height and width relationships among the characters changed. Further degradation of the typeface occurs when the size of the characters is globally increased by multiplying the dimensions by a factor, because the inconsistencies in the typeface are also multiplied by that factor.

Another problem arises due to the fact that the thicknesses or heights of characters or portions of characters may be approximately, but not exactly, the same height or width. As the scale of the typeface decreases, the likelihood of distortion increases due to the small differences in height or width. If, for example, the heights of the characters are exactly the same, the scaled version of each of the characters would also be exactly the same. However, if the heights differ by a small value and the display is a low resolution device, the height of one character may be rounded off to one pixel and the height of another character may be rounded off to a different pixel even though the original difference in height may have been less than 0.25 of a pixel. In small scale (low resolution) cases similar to the above example, it is desirable to round the heights of the character to the same pixel in order to maintain the original symmetry and proportions. Thus, the typeface loses the original symmetry and proportion among characters and portions of characters in the typeface again resulting in the visual degradation of the typeface.

To solve these problems, skilled technicians are employed to manually correct any deficiencies in the typeface by reviewing each character and modifying portions of the character which the technician usually perceives to increase the legibility. However, this process is time consuming and costly. There are two primary variables that have to be considered when scaling a digital typeface for display: (1) the different sizes of the font, e.g. 9 point, 10 point or 12 point; and (2) the different resolutions of the display or output device. For each typeface, the manual process must be performed for each possible scale which is equal to the product of the resolution and font size. In addition, the quality of the work is dependent on the skill of the technician. Computer aided processes have been introduced to assist in the manual process. For example there are systems, which display the character and provide a means for the skilled technician to view and modify the character on the display. However, the process of adjustment, what to adjust and how much to adjust is still performed by a skilled technician. U.S. Pat. No. 4,675,830 discloses a method for producing scaling typeface data in which the relative dimensions of the characters are preserved. However, the process disclosed requires not only the input of data which describe the typeface but also control information such as key points of the typeface which are aligned with the grid points and dimensions that are to exist between grid points. This additional input must be generated manually by a skilled technician who develops the control information by visual inspection of the typeface.

SUMMARY OF THE INVENTION

It is therefore an object of the invention to minimize the visual degradation of a digital typeface.

It is an object of the invention to provide an automated method for increasing the legibility of a digital typeface.

It is further an object of the invention to maintain the visual symmetry and proportions among the characters of the typeface.

It is an object of the present invention to provide a method of intelligent scaling.

It is an object of the invention to provide a process for establishing a classification of visual components which comprise the characters of the typeface.

It is further an object of the invention to provide a process for determining the priority of visual components of the typeface wherein the higher priority components are aligned with grid positions and the alignment of the lower priority components is dependent on the alignment of the higher priority component.

Through the method and apparatus of the present invention, the visual degradation of digital typefaces is minimized without the manual input of the skilled technicians.

The present invention provides methods and apparatus which are most advantageously used in conjunction with a digital computer to minimize the visual degradation that occurs when preparing and scaling digital typefaces. In the method and apparatus of the present invention, the frames, which are used to describe each character, are modified according to a predetermined set of rules which analyzes and establishes the visual components which make up each character and the priority in which the components are aligned on grid points and with respect to previously aligned components.

The control points, which are used to define the character in a digital typeface format, are analyzed to determine the frame of a character. The frame is a simplified form of the character which comprises important visual properties or components of the character which are to be preserved. The frame is analyzed in the horizontal direction and vertical direction to determine the priority or importance of the coordinates which define the outline of the frame. The important coordinates, referred to as master coordinates, are then further analyzed to determine the corresponding master segments. These segments are then analyzed to determine the pairs of segments which form strokes. The strokes are classified and prioritized.

Using the visual components determined, from the analysis of the character, the coordinates of the frame are adjusted starting with the highest priority component, the highest priority stroke, according to certain rules which are dependent upon whether the strokes formed are oriented in the horizontal or vertical direction. Components lower in priority, such as the lower priority strokes, master coordinates which are not part of a stroke and frame coordinates which are not defined as master coordinates, are then modified or aligned in a manner that is dependent on the previously aligned components. As a result of the priority and rules for adjustment, the important visual components of each character and the relationship of the visual components of each character with the other characters of the typeface are preserved thereby minimizing the visual degradation of the typeface.

BRIEF DESCRIPTION OF THE DRAWINGS

The objects, features and advantages of the method and apparatus for the present invention will be apparent from the following detailed description of the preferred embodiment in which.

NOTATION AND NOMENCLATURE

Figure 1:
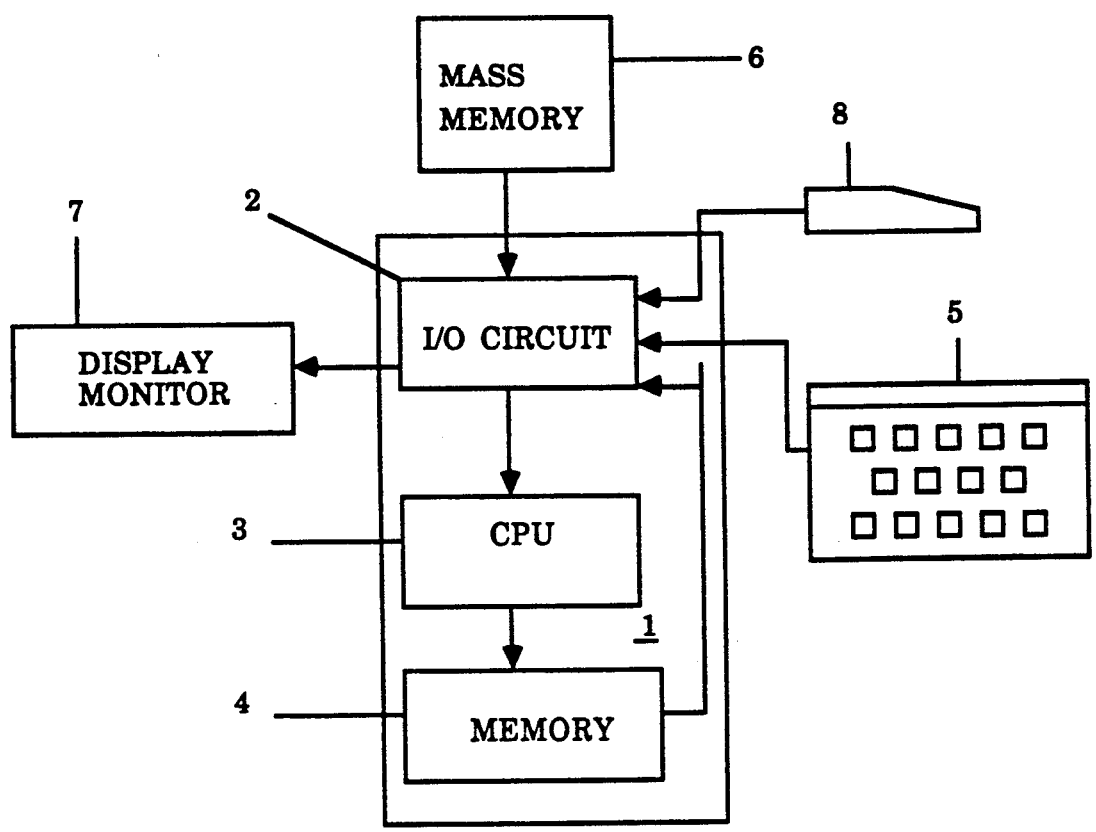
FIG. 1 illustrates a computer incorporating the present invention.

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

DETAILED DESCRIPTION OF THE INVENTION

The following detailed description will be divided into several sections. The first of these will discuss a general system arrangement for performing the process for minimizing the visual degradation of digital typefaces. Subsequent sections will deal with such aspects of the present invention as the analysis of the typeface data to determine the important visual components of each character in the typeface and the priority of adjustment of the visual components and adjustment of the characters in horizontal, vertical and diagonal directions.

In addition, in the following description, numerous specific details are set forth such as algorithmic conventions, character definition conventions, specific numbers of bits, etc., in order to provide a thorough understanding of the present invention. However, it will be obvious to one skilled in the art that the present invention may be practiced without these specific details. In other instances, well-known circuits and structures are not described in detail in order not to obscure the present invention unnecessarily.

General System Configuration

FIG. 1 shows a typical computer-based system for increasing the legibility of digital typeface according to the present invention. Shown there is a computer 1 which comprises three major components. The first of these is the input/output (I/O) circuit 2 which is used to communicate information in appropriately structured form to and from the other parts of the computer 1. Also shown as a part of computer 1 is the central processing unit (CPU) 3 and memory 4. These latter two elements are those typically found in most general purpose computers and almost all special purpose computers. In fact, the several elements contained within computer 1 are intended to be representative of this broad category of data processors. Particular examples of suitable data processors to fill the role of computer 1 include machines manufactured by Sun Microsystems, Inc., Mountain View, Calif. Other computers having like capabilities may of course be adapted in a straightforward manner to perform the functions described below.

Also shown in FIG. 1 is an input device 5, shown in typical embodiment as a keyboard. It should be understood, however, that the input device may actually be a card reader, magnetic or paper tape reader, or other well-known input device (including, of course, another computer). A mass memory device 6 is coupled to the I/O circuit 2 and provides additional storage capability for the computer 1. The mass memory may include other programs and the like and may take the form of a magnetic or paper tape reader or other well known device. It will be appreciated that the data retained within mass memory 6, may, in appropriate cases, be incorporated in standard fashion into computer 1 as part of memory 4.

In addition, a display monitor 7 is illustrated which is used to display messages or other communications to the user. Such a display monitor may take the form of any of several well-known varieties of CRT displays. Preferably, the display monitor 7 may also display the graphic images i.e. the typefaces generated from the digital typeface data modified according to the process of the present invention. A cursor control 8 is used to select command modes and edit the input data, such as, for example, the scale of the typeface, and provides a more convenient means to input information into the system.

Process Overview

Referring to FIGS. 2(a)-2(d) several upper case and lower case characters of a typeface are shown. In FIGS. 2(a)-2(d) lower case "o" and "f" and upper case "N" and "G" are illustrated. Associated with each character is a set of points, for example points 10, 15, 20 and 25 which are the control points of the character. The control points are dependent on the digital format that is used to describe the character. In the present example the characters are described and control points reflect a contour format comprising straight line segments and arcs of conics and beziers. Straight line segments are described by two control points, conic arcs are described by three control points and bezier arcs are described by four control points. For example, FIGS. 2(a)-2(d) control points 10, 15 and 25 describe a conic arc between points 15 and 25 wherein control point 10 dictates the arc or the radius of the curve. There are many other formats such as the IKARUS format, DI format, the VC format and the VS format which are also used to define digital typefaces. However, in the description of the present invention the format described above will be used.

Throughout the description of the process, the characters are represented and described according to a single convention. However, the process is not limited to use with a single convention and may be easily applied to other conventions. In the following convention, the character consists of one or more contours each defining a boundary between "black" and "white". Each contour consists of a begin point followed by a sequence of arcs. Each arc is defined by a curve type and two or more control points. Due to the continuity of the contour the first point of each arc is implicitly the last of the previous one. The last point of the last arc must be coincident with the beginning point. The contours are defined in relation to a coordinate system such that: (1) when the character is viewed in the normal reading position the X axis points in the direction of successive character placement, e.g. to the right for the roman alphabet, down for a Chinese font; (2) the Y axis is 90% counter clockwise from X; and (3) the direction of the contour is clockwise if the region enclosed is black, otherwise the direction of the contour is counter clockwise. No arc has inflections or extremes except at the end points of the arc. Note that an arc that has an inflection or extreme which is not at an end point, can be subdivided into two arcs at the point of the inflection or extreme such that the inflection or extreme occurs at the end points of the newly created arcs.

Figure 2A:
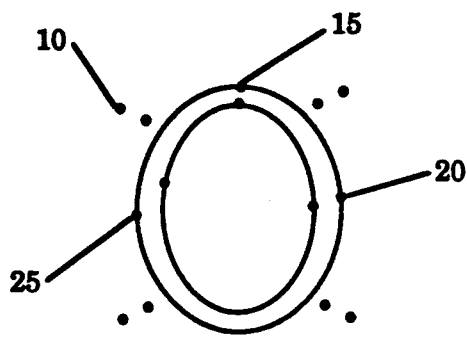
FIGS. 2(a)-2(d) illustrates the control points used to digitally describe the character and FIG. 2e illustrates the contour convention used in the description of the method and apparatus of the present invention.
Figure 2B:
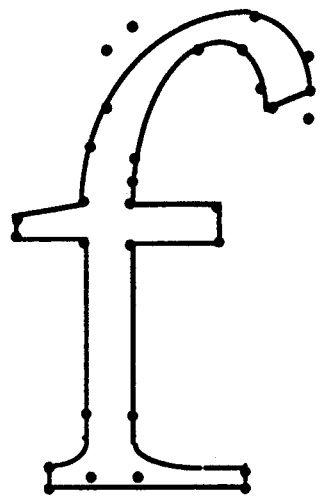
Figure 2C:
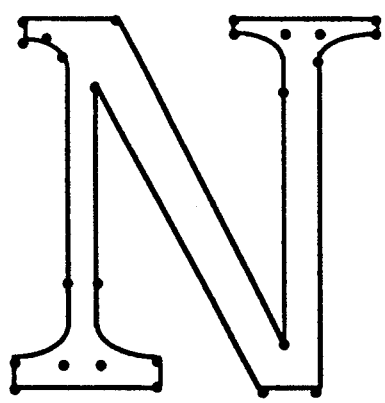
Figure 2D:
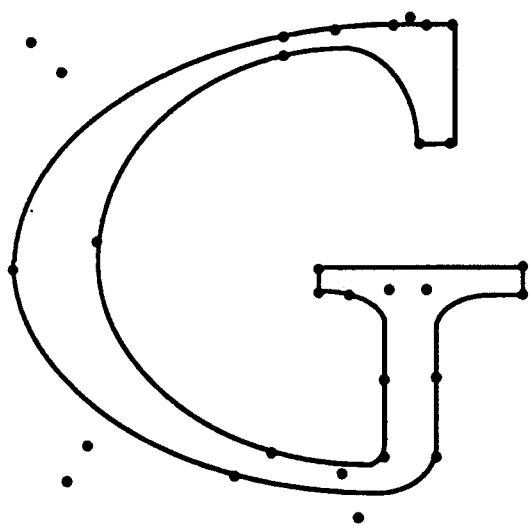
Figure 2E:
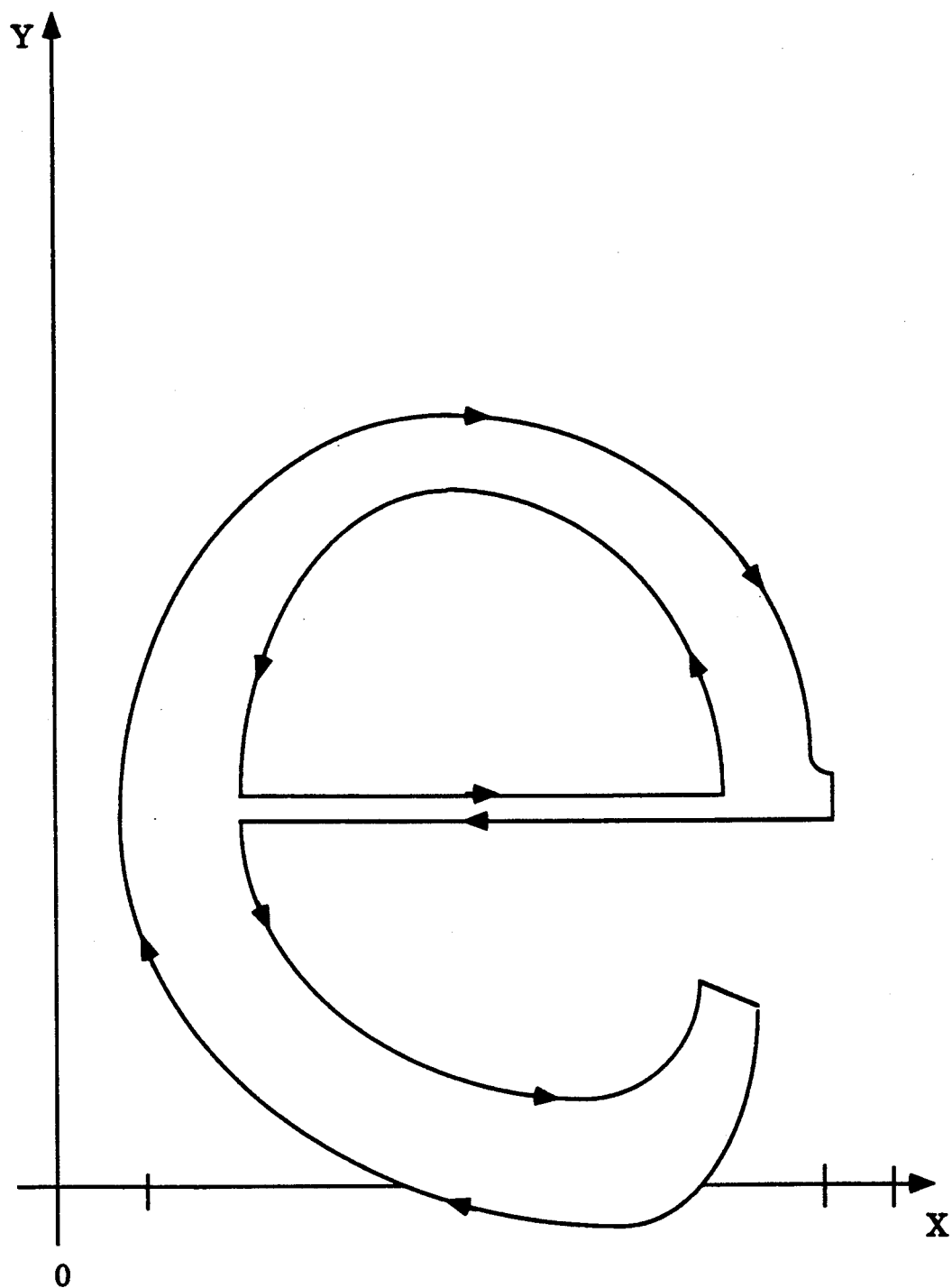

To better understand this convention the letter "e" is illustrated. Referring to FIG. 2(e) the outside contour of the character is oriented in a clockwise direction reflecting that the outside contour encases a black region. The inside contour surrounds a white region and is therefore the contour oriented in the counter clockwise direction.

The curve types description (i.e. straight line segment, arcs of conics or arcs of Beziers) remain invariant during the adjustment process only the control points change. The adjusted character is then the one defined by the same curve types description controlled by the adjusted control points.

In the description reference is made to the the resolution, font size and the scale of the display device. The resolution of the display device is described in terms of pixels, a known computer graphic display quantity. The resolution may be expressed as the total number of pixels in the horizontal and vertical direction (e.g. 1024 pixels ×1024 pixels) of the display or the number of pixels per inch. The font size is expressed in units called points, a well known unit in the art of typography. If a font size is ten point, the distance to the top of the highest character of the font (e.g. the letter "A"), called the ascender distance, plus the distance to the bottom of the lowest character of the font (e.g., the letter "g") called the descender distance, is ten points in length. One A point is equal to 1/72.3 inches. The scale is equal to the product of resolution and the font size, for example, if the font size is 6 points and the resolution is 144 pixels/inch the scale is:

$$\frac{6 \text{ point}}{(72.3 \text{ points/inch})} \cdot \frac{144 \text{ pixels}}{\text{inch}} = 12 \text{ pixels}$$

Figure 3:
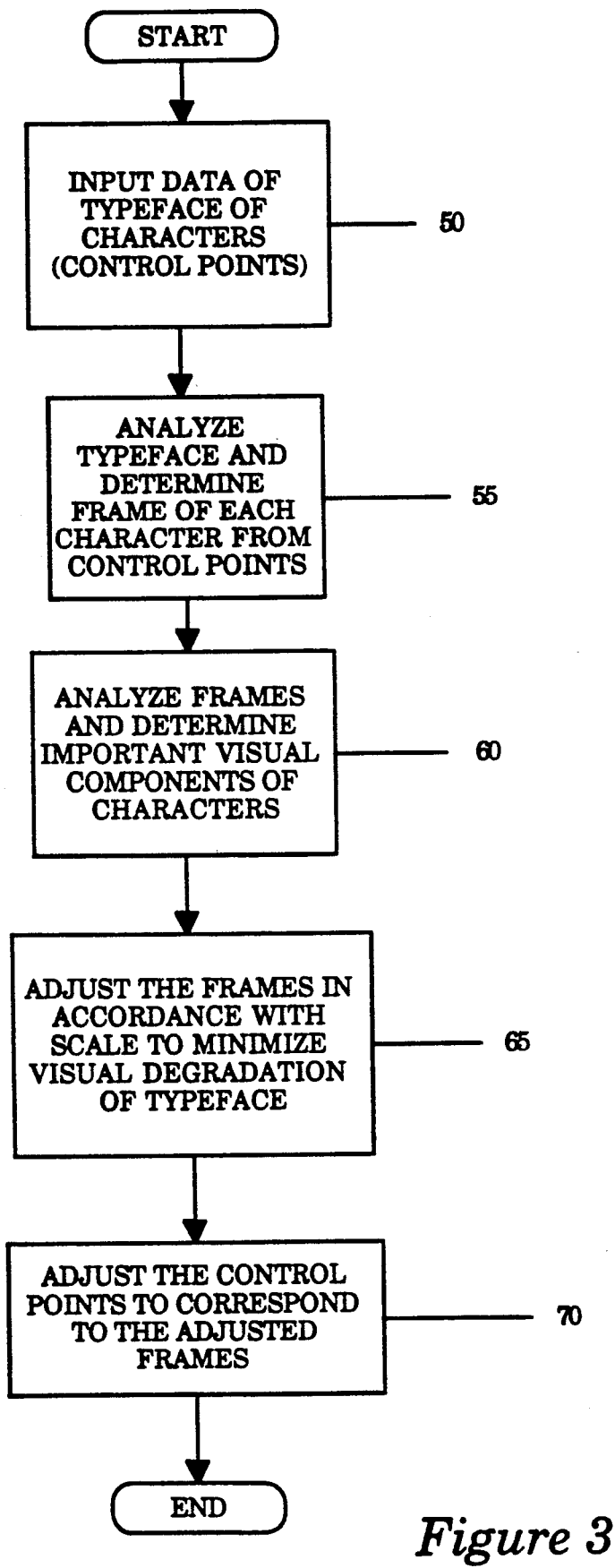
FIG. 3 is a flow chart generally depicting the process of the present invention.

Referring to FIG. 3, the process of the present invention is briefly described. At block 50, the input data, which consists of the control points for each of the characters of the typeface, is input to the system. At block 55, the system analyzes this information and determines from the control points input the frame of the character. At block 60, the coordinates which define the frame are further analyzed to determine the important visual components of each of the characters of the typeface and the priority or order of importance that these components adjusted to minimize the visual degradation of the typeface. At block 65, using the frames of the characters and the analysis of the important visual components, the characters of the typeface are adjusted using an innovative intelligence scaling method to produce adjusted frames according to the scale desired. The process preserves the important visual features of the typeface, particularly the consistency of the stroke thicknesses, the horizontal alignment of the characters (i.e., the alignment of the Y coordinates of the characters), the proportion of the white space within a character as well as the total width of the characters. At block 70, the original control points of each of the characters are then adjusted to correspond to the adjusted frames. The adjusted control points are used to control the curve types description to produce characters in which the visual degradation of the typeface has been minimized.

Analysis of Characters of Typeface

Figure 4A:
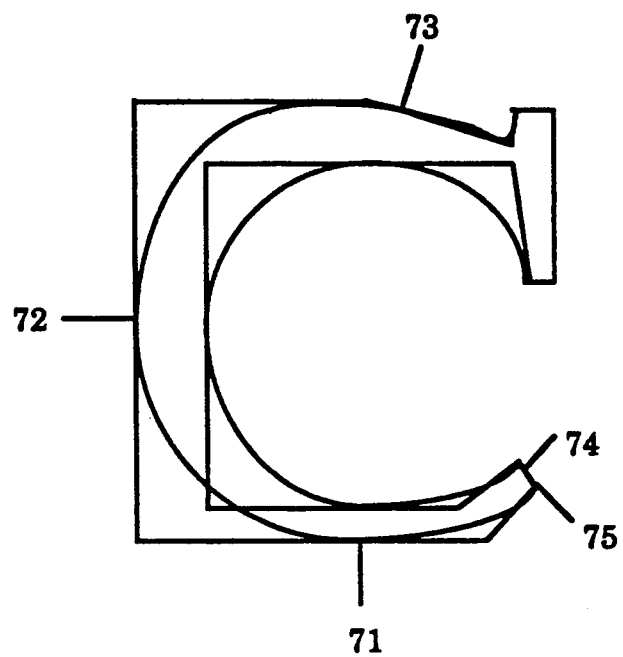
FIG. 4a is an illustration of a character and the corresponding frame.

The first step of the process is to determine the frame of each character. The object of determining the frame is to simplify each of the characters to a series of discrete points which may be analyzed and modified to adjust the character. A frame is a collection of polygons, one for each of the characters contours. These polygons are simpler than the original character, yet they retain the characters' fundamental visual properties. The frame comprises a sequence of straight line segments that follow the shape of the character such that there is a straight line segment for every horizontal tangent, vertical tangent, straight line segment, tangent of an inflection point and for the tangents at a slope discontinuity. Utilizing the character shown in FIG. 4a, the frame is formed by connecting the horizontal tangents, 71, vertical tangents 72, tangents of inflection points 73, straight line segments of the character 74 and tangents at the slope discontinuities 75.

Figure 4B:
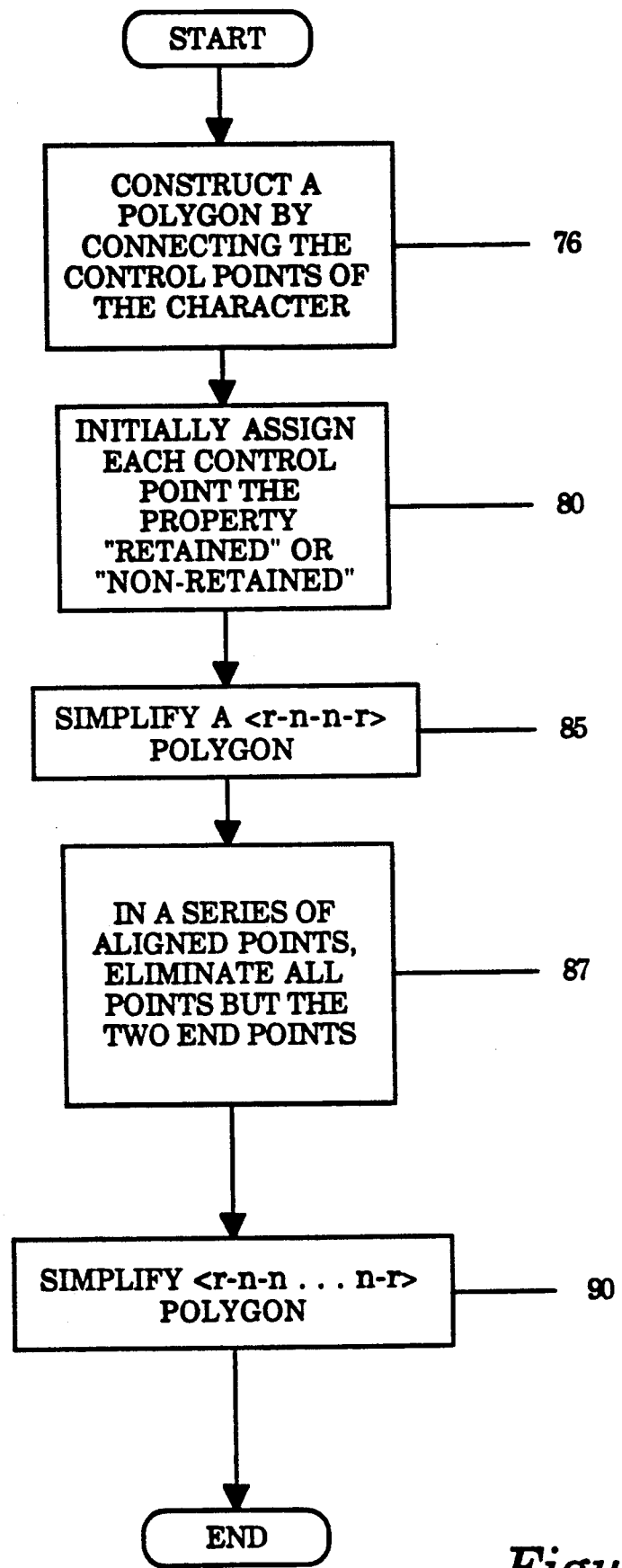
FIG. 4b is a flow chart illustrating a method for determining the frame of the character.

Preferably, the process depicted in FIG. 4b is used to construct the frame of a character. At block 76, a polygon is constructed by connecting the control points of the character in the sequence they are ordered (according to the direction of the frame). At block 80, each control point is then assigned the property retained ("i") or non-retained ("n"). Initially, the control points which correspond to the end points of the arc are retained and the remaining points are identified as non-retained. The retained points are those points which will be subsequently identified as the frame points.

The polygon is then simplified into a lower order polygon by eliminating those control points which are not necessary to maintaining the fundamental visual properties of the character. In a sequence of polygon sides <r-n-n-r> (typically representative of a Bezier arc) the central side is deleted, that is the side between the two non-retained points and the surrounding sides are extended until they intersect one another. The new point which occurs at the intersection of the two sides is labeled non-retained. At block 87, in a series of aligned points, all points but the two extreme points are eliminated. If the sequence contained two or more retained points or if one of its points is an inflection, the remaining points, the two extreme points, are labeled retained. At block 90, for a sequence of points <r-n-n ... n-r>, all sides lying between consecutive <n> points are eliminated and the sides at the ends of the sequence bounded by <r-n> and <n-r> points are extended towards one another until they insect. The point of intersection is labeled retained.

Figure 5:
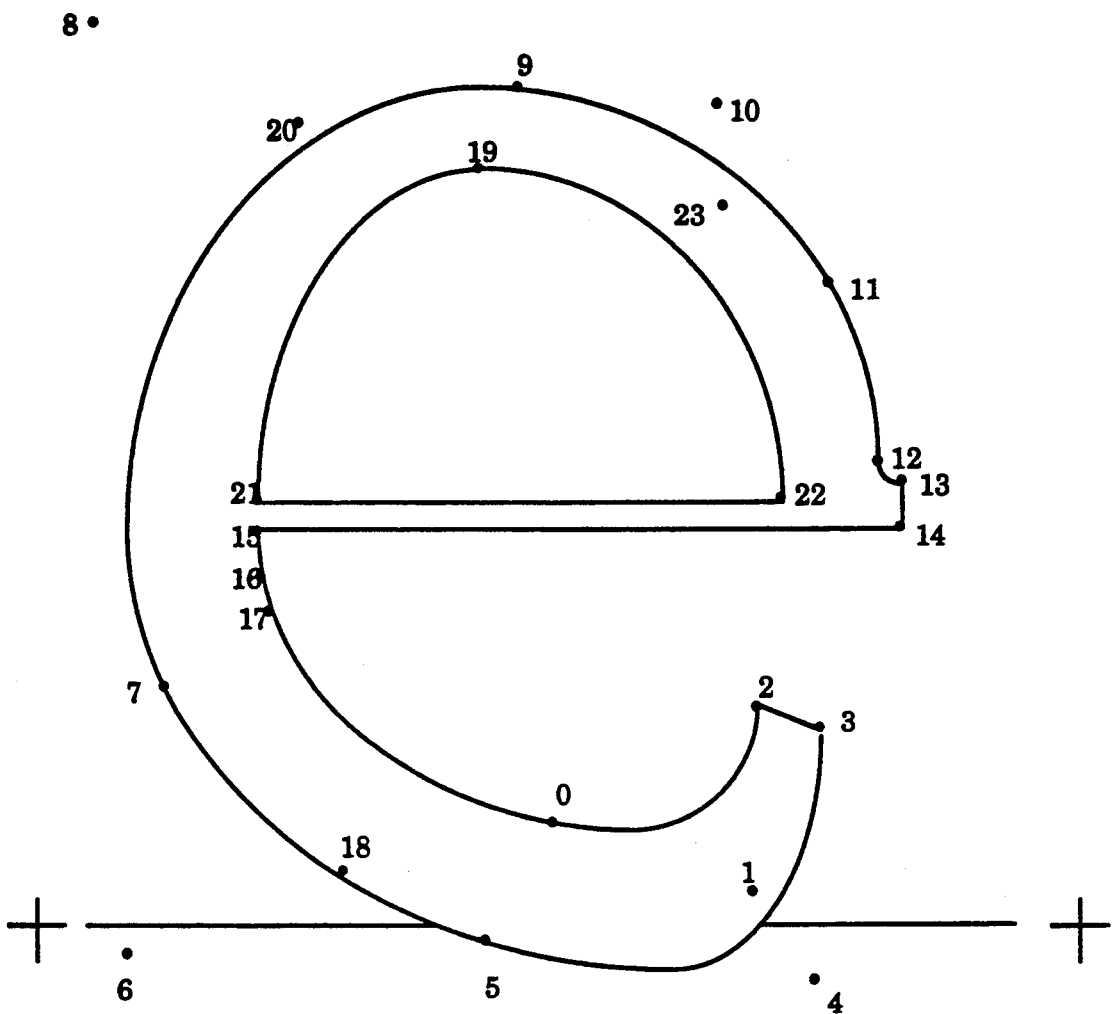
FIG. 5 shows the letter "e" and its control points.
Figure 6:
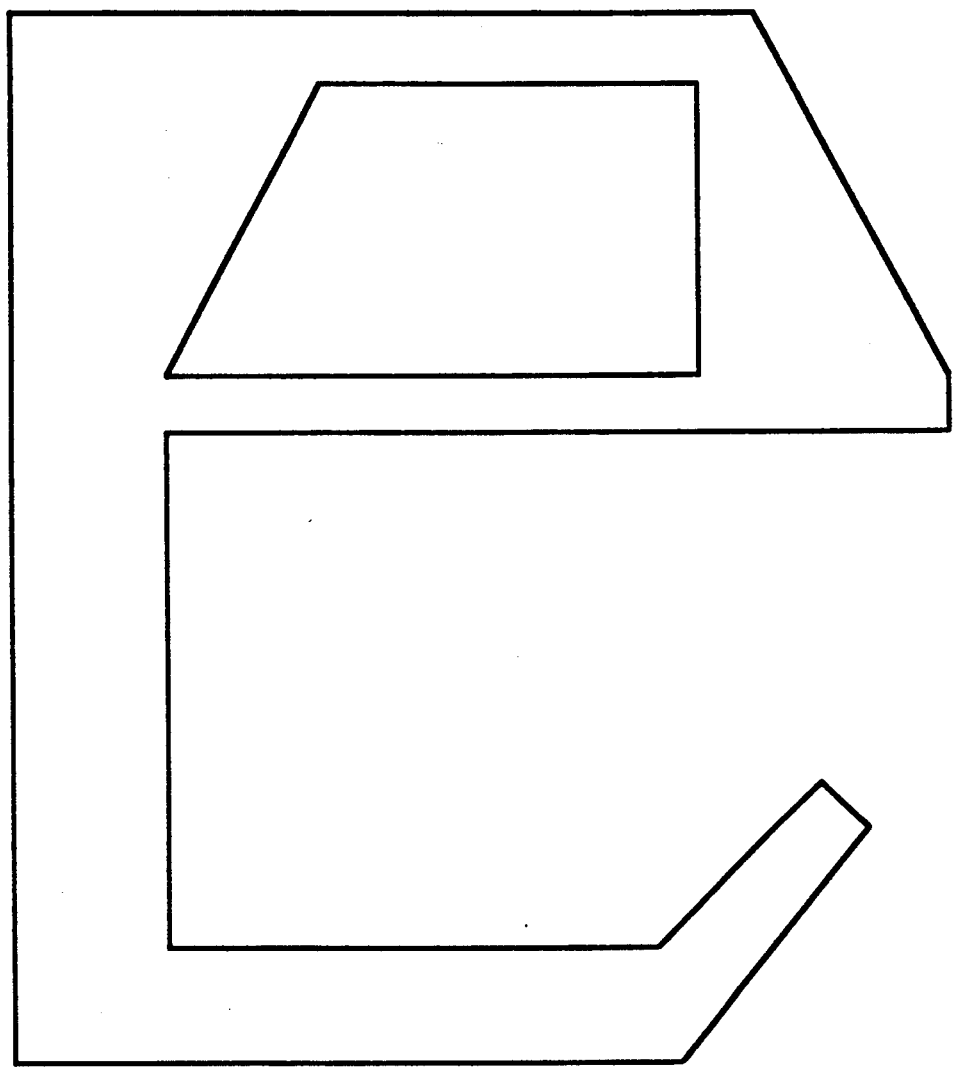
FIG. 6 shows the frame formed from the letter "e" depicted in FIG. 5.

The points remaining after the completion of the above process are the frame points which form the frame of the character. FIG. 5 shows the letter "e" identified by its control points. FIG. 6 shows the frame for the character It is evident that although the character is simplified somewhat, e.g. the edges are squared and the character is drawn as straight line segments, the important visual characteristics are maintained. Particularly, the relative thickness of certain points of the character with respect to other sections of the character, the height and width of the character as well as the relative angles of various sections of the character are important visual features which are preserved.

The frame provides a simplified representation of the character to perform the subsequent analysis and adjustment operations on. Once the frame has been adjusted, the adjusted values of the control points of the character, which were eliminated when forming the frame, may be computed from the known geometric relationships between the original values of the frame and the control points.

Figure 7A:
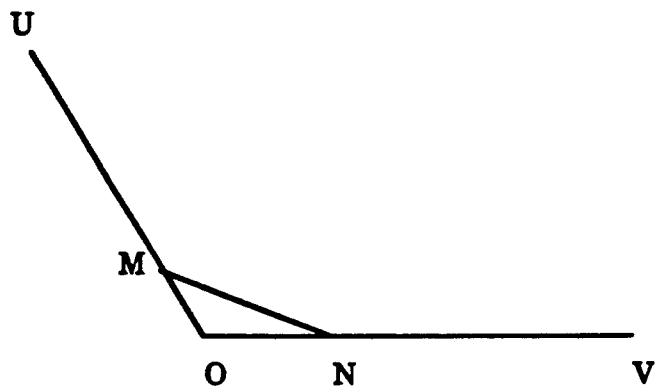
FIG. 7a, 7b and 7c illustrates the geometric relationships between control points and frame points.

For example, FIG. 7 illustrates the three situations during the above described process for forming the frame in which control points are eliminated. FIG. 7a illustrates a polygon representation of a Bezier arc. The three segment arc is identified by points U-M-N-V. Control point U and control point V are the end points of the arc. During the process of forming the frame, control points M and N were eliminated and the line segments represented by control points U-M and V-N were extended until they intersected one another at point O thereby simplifying the polygon to two segments, U-O and O-V. Using linear transformations, the adjusted value of control point M may be calculated using the following equation:

$$\overline{M}' = \overline{U}^* tm + \overline{O}^* (1 - tm), tn = \frac{|\overline{M} - \overline{O}|}{|\overline{U} - \overline{O}|}$$

Where $\overline{M}'$ is the adjusted value of $\overline{M}$, $\overline{O}'$ is the adjusted value of $\overline{O}$ and $\overline{U}'$ is the adjusted value of $\overline{U}$.
N is similarly adjusted using the equation:

$$\overline{N}' = \overline{V}^* tn + \overline{O}^* (1 - tn), tn = \frac{|\overline{N} - \overline{O}|}{|\overline{V} - \overline{O}|}$$

Where $\overline{N}'$ is the adjusted value of $\overline{N}$, $\overline{V}'$ is the adjusted value of $\overline{V}$ and $\overline{O}'$ is the adjusted value of $\overline{O}$.

Figure 7B:
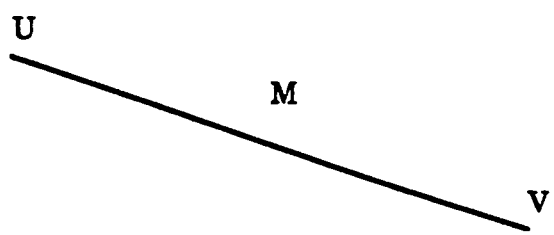

Similarly, FIG. 7b illustrates a series of aligned control points U-M-V wherein control point M was eliminated during the process of forming the frame. The adjusted value of M may be computed according to the following equation:

$$\overline{M}' = \overline{V}^* tm + \overline{U}^* (1 - tn), tn = \frac{|\overline{N} - \overline{U}|}{|\overline{V} - \overline{U}|}$$

Where $\overline{M}'$ is the adjusted value of control point $\overline{M}$, $\overline{U}'$ is the adjusted value of $\overline{U}$ and $\overline{V}'$ is the adjusted value $\overline{V}$.

Figure 7C:
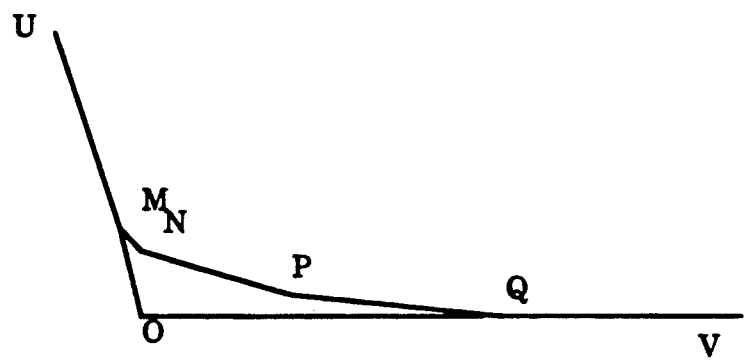

FIG. 7c illustrates a sequence of points <r-n-n ... n-r> wherein the control points M, N, P and Q between end points U and V were eliminated and replaced by a single control point, identified by 0, which was formed by extending segments U-M and V-0. The adjusted values of the control points eliminated may be calculated using linear transformations. For example, the adjusted value of control point M may be calculated according to the following equation:

$$\overline{M}' = [M'_x M'_y] = [M_u M_v] \times \begin{bmatrix} V_x - O'_x & V_y - O'_y \\ U_x - O'_x & U_y - O'_y \\ O'_x & O'_y \end{bmatrix}$$

Where Mu and Mv identify the location of the control point relative to control points U and V, $V'_x$ and $V'_y$ are respectfully the adjusted X and Y coordinate values of V, $U'_x$ and $U'_y$ are respectively the adjusted X and Y coordinate values of U and $O'_x$ and $O'_y$ are respectively the adjusted X and Y coordinate values of O.

Control points N, P and Q may be similarly calculated by substitutions of the control point coordinate values for the values of M in the above equation.

The innovative adjustment process of the present invention is then applied to the frame points to adjust the characters and to insure that the relative heights and widths of the character and visual relationships which the user perceives are maintained for any given scale.

Analysis is performed on each frame to further simplify the characters by determining the important visual features to preserve and to break down the frame into a plurality of visual components which are prioritized. The visual components determined are subsequently adjusted according to the priority to minimize the visual degradation of the typeface.

Figure 8:
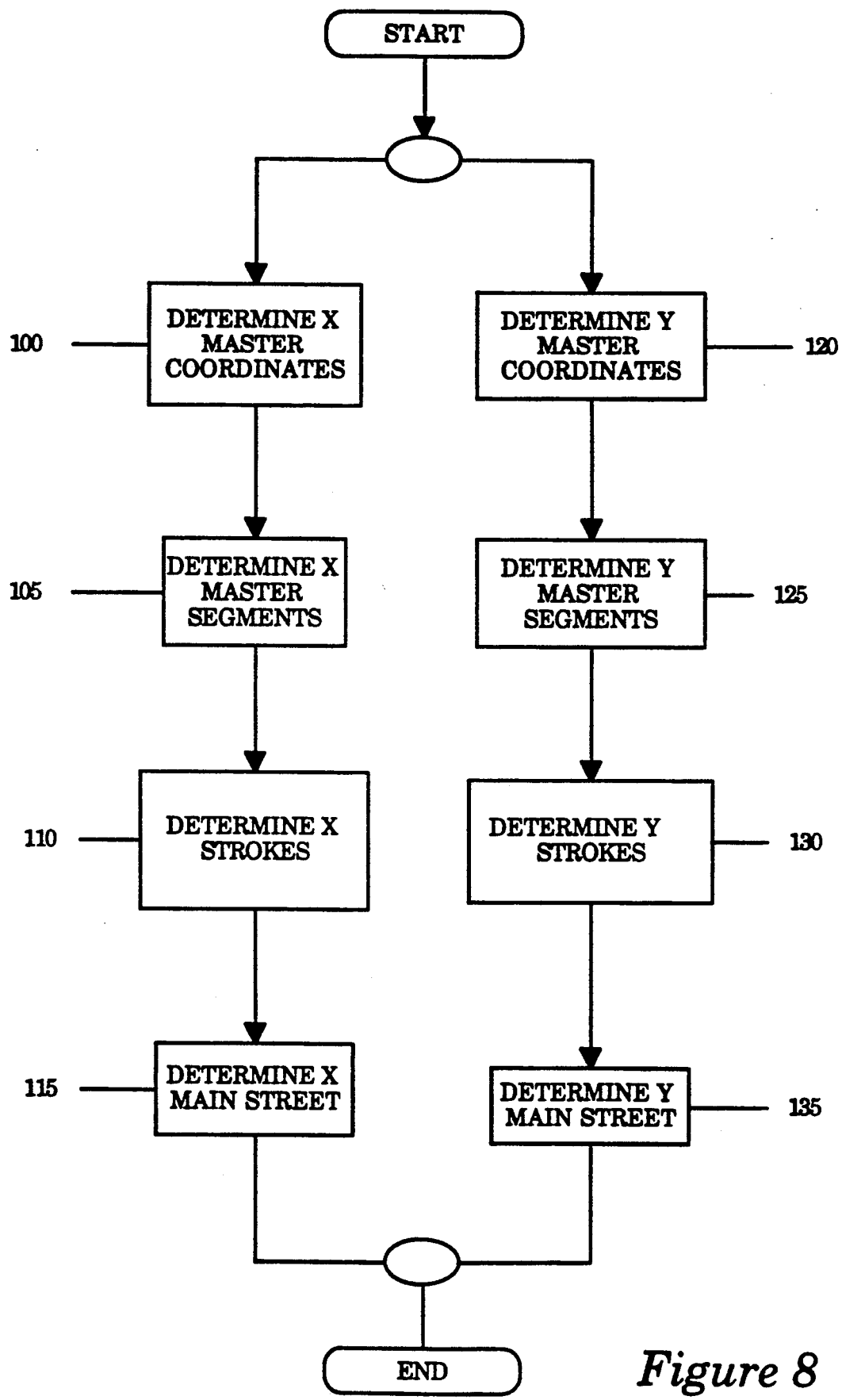
FIG. 8 is a flow chart briefly describing the analysis process of the present invention.

The process of determining the important visual features of each character is briefly described in the flow chart of FIG. 8. The frames of the characters are separately analyzed in the horizontal and vertical directions to determine the important visual components and priority of importance during the subsequent adjustment process.

At block 100, the frame points are first examined to determine the X master coordinates. An X master coordinate is defined as those X coordinates of the frame points which are important to the visual presentation of the character.

Once the X master coordinates are determined, at block 105, the X master segments are formed. These segments are formed in the vertical direction using the X master coordinates. At block 110, X strokes are formed by pairing X master segments. At block 115, the X main street is determined, comprising the most important visual elements of the character with respect to the X coordinates.

The Y coordinates are similarly analyzed. At block 120, the Y master coordinates are determined. Using the Y master coordinate, at block 125, the Y master segments are formed, at block 130 the Y strokes are formed and at block 135 the Y main street is determined. Once the analysis is complete, the important visual components of the characters—the master points, master segments, strokes and main street—are determined. The priority of the components corresponds to the order in which the components were determined, the main street having the highest priority and slave points, those frame points which are not master points, having the lowest priority.

Figure 9A:
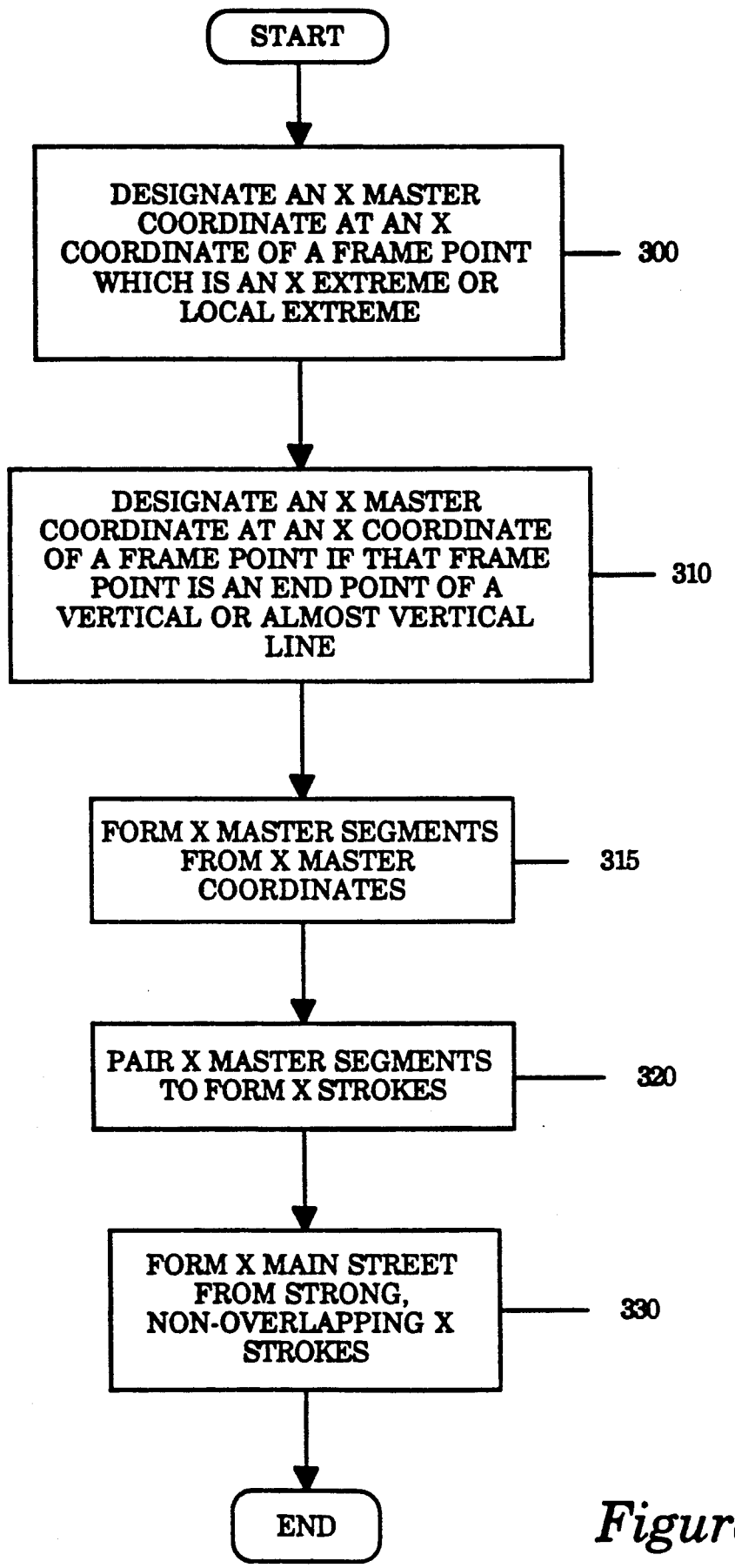
FIG. 9a is a flow chart describing the process of determining the visual components with respect to X coordinates up to the highest priority visual component, the X main street.

The analysis of the frame to determine the important visual components will now be described in detail. As stated above, the X master coordinates are first determined. Referring to FIG. 9a at block 300 an X master coordinate is designated at each X coordinate of a frame point which is an X extreme or local extreme. For example, in the character "F", X extremes exist at the far fight and far left of the top horizontal line and a local X extreme exists at the far right of the lower horizontal line. The right end of the lower horizontal line is a local extreme because the line does not extend as far fight as the top line but in that local area of the character it extends the furthest to the fight. The extremes form the limits or edges of the character which is an important visual feature, since it dictates the height or width of a character or a portion of a character.

At block 31 0 an X master coordinate is also designated at an X coordinate of a frame point if that frame point is an end point of a vertical or almost vertical line of the frame. An almost vertical line is a line in which may be visually perceived to be vertical. Preferably an almost vertical line has a range of 1:5 to 1:20.

Those coordinates which are not X master coordinates are designated an X slave coordinate and are the lowest priority visual component of the character.

At block 315, X master segments are then formed using X master coordinates. An X master segment is formed starting at each X master coordinate and extending vertically in an upward and downward direction. Each end of the segment extends away from the frame point corresponding to the X master coordinate point until each end of the segment is a predetermined horizontal distance away from the side of the frame which extends in the upward direction away from the master coordinate point, if the end point of the master segment is extending in the upward direction, or the side of the frame which extends away from the X master point in the downward direction, if the end point of the master segment extends in the downward direction. This predetermined distance is approximately one-half the maximum pixel size that will be used to generate the typeface. In practice the minimum number of pixels per unit as defined by the sum of ascender and descender heights of a typeface is approximately 10. Therefore it is preferred that the predetermined distance is in the range of 0.01 to 0.02 of the distance defined by the sum of the ascender and descender heights. These segments represent a further simplification of the important visual features of the character.

As set forth in block 320, the X master segments are paired according to certain rules to form strokes. In typography, a stroke is known as the kind of shape produced by a pen or a brush when moved along a rectilinear or slightly curved trajectory. In the system of the present invention, the strokes represent the primary visual elements of the characters and are the elements that are most important in the adjustment process. An X stroke is found where two segments vertically overlap one another for a distance sufficient for the visual definition of a stroke.

The direction of the segment is used to describe the color of the segment and corresponds to the convention used. Segments representing a portion of the curve of a character inherit the properties of the curve; therefore the segments representing a portion of the curve inherit the in/out property of that portion of the curve. In accordance with the contour convention described previously, an X segment has an "in" color if it is oriented in the positive or up direction and has an "out" color if it is oriented in the negative or down direction. In addition, the X master segments are examined in the order of increasing coordinates, that is, the segments would be examined from the left, where the lower coordinate values are located, to the right where the higher coordinates values are located. Thus, two segments would be opposing if the first stroke examined has an "in" color and the second stroke has an "out" color.

The in/out segments must vertically overlap one another for a distance such that the combination of the two segments forms a visually recognizable stroke. It is preferable that the existence of a stroke be determined according to the ratio of the distance the segments vertically overlap to the distance between segments. If a stroke ratio is greater than or equal to 1:1 it is considered a stroke and if it is less than 1:1 the two segments do not form a stroke. The segments vertically overlap one another if the Y minimum coordinate value of each segment is less than the Y maximum coordinate value of the opposing segment. The amount of overlap is equal to the smallest Y maximum value of the two segments minus the largest Y minimum value of the two segments.

Figure 10A:
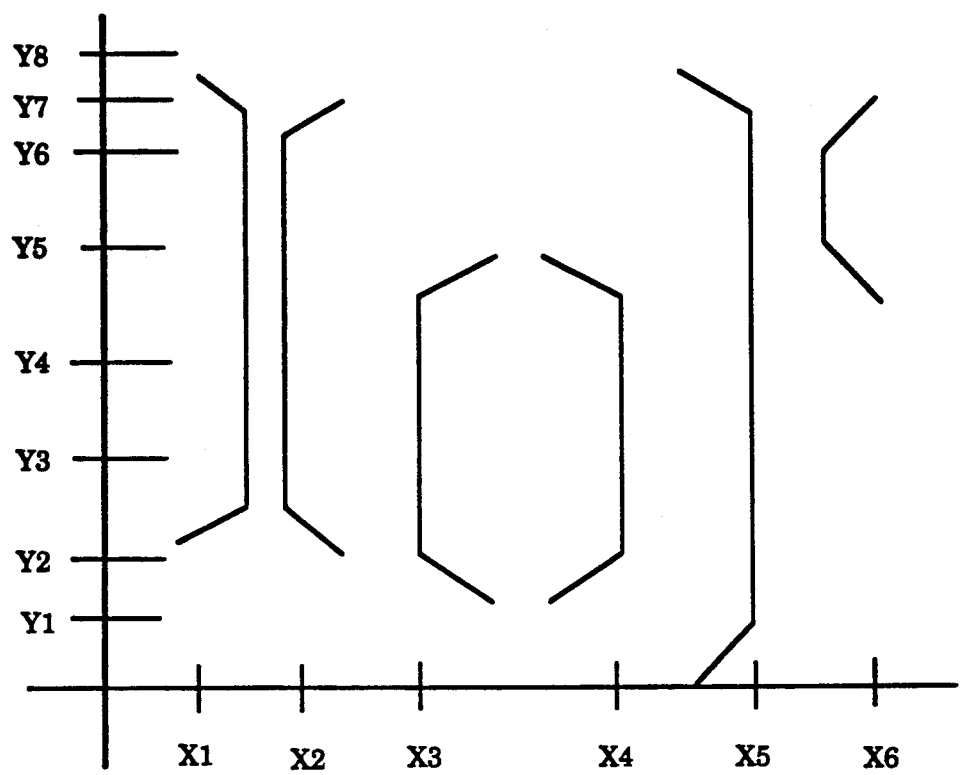
FIG. 10a illustrates X master segments and X strokes.

The pairing of X master segments to form X master strokes may best be explained through illustration. Referring to FIG. 10a, six segments are shown, located at X coordinates $X_1$-$X_6$. To determine which X master segments form strokes, the X master segments are examined from left to right to attempt to pair opposing segments. Therefore the master segment $X_1$ is examined with the master segment at $X_2$. The master segment at $X_1$ has an "in" color and the master segment at $X_2$ has an "out" color. Therefore the segments oppose one another. The segments are further examined to determine if the segments vertically overlap one another. The segments do vertically overlap one another because the minimum Y coordinate value of the $X_1$ segment, $Y_3$, is less than the maximum Y coordinate value of the opposing ($X_2$) segment, $Y_6$, and the minimum Y coordinate value of the $X_2$ segment, $Y_3$, is less than the maximum Y coordinate of the opposing ($X_1$) segment, $Y_7$. The amount of vertical overlap equals:

$$\text{MIN}(Y_7, Y_6) - \text{MAX}(Y_3, Y_3) = (Y_6 - Y_3)$$

Where MAX and MIN are functions which respectively determine the maximum and minimum of the values. Visually it can be seen that the ratio of the amount of vertical overlap to the distance between segments is greater than 1:1; therefore the segments at $X_1$ and $X_2$ form a stroke.

The segments at $X_3$ and $X_4$ do not form a stroke because the segments do not fulfill the requirement for opposing segments that first segment examined, the left segment, has an "in" color and the second or right segment has an "out" color. Similarly the segments at $X_4$ and $X_5$ do not form a stroke because the segments are not opposite in color and therefore do not oppose one another. The final pair of segments analyzed, $X_5$ and $X_6$, do not form a stroke because the amount of vertical overlap is so small that the stroke ratio is less than 1:1.

At block 330, FIG. 9a, the X main street is constructed. The X main street comprises non-horizontally overlapping, strong X strokes. Each -5 stroke is classified as a strong stroke or as a weak stroke. A strong stroke will be evaluated prior to and will have priority in the adjustment process over a weak stroke because it has a greater visual impact on the viewer and is more discernable by the viewer. Preferably a stroke is a strong stroke if the stroke ratio is greater than or equal to 1.5:1. If the stroke ratio is less than 1.5:1, the stroke is classified as a weak stroke.

The strokes are evaluated in order of length such that if two strokes horizontally overlap, the longer stroke will be on X main street. The X main street reflects the most important visual elements of the character with respect to the X coordinates; therefore, the strokes on main street will be the first elements to be adjusted in the horizontal direction in order to minimize the visual degradation of the typeface. Referring to the example illustrated in FIG. 10a, the stroke formed by the segments at locations $X_1$ and $X_2$ is part of X main street because the stroke is a strong stroke and does not horizontally overlap a longer strong stroke.

Figure 9B:
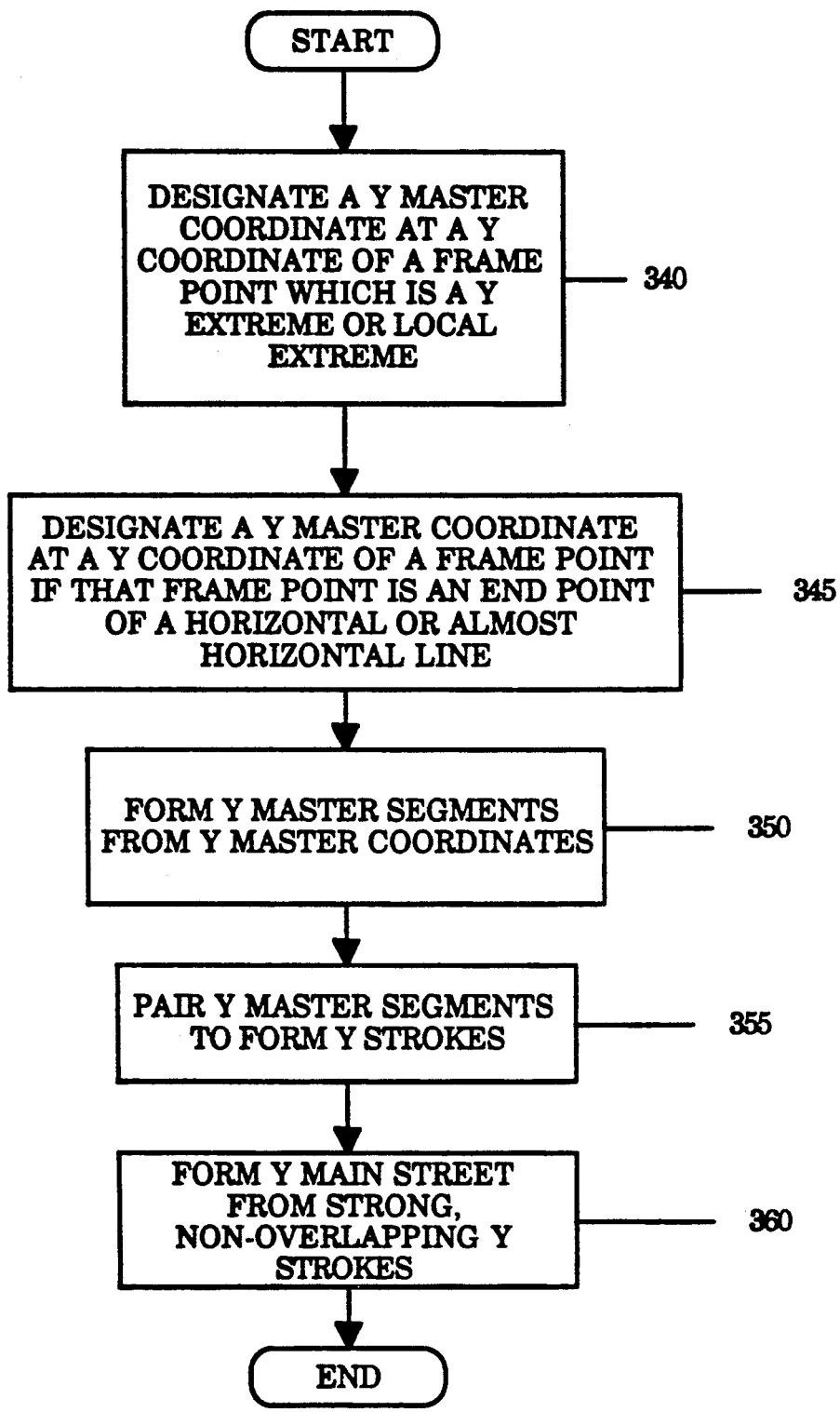
FIG. 9b is a flow chart describing the process of determining the visual components with respect to the Y coordinates up to the highest priority visual component, the Y main street.

The Y coordinates of the frame points are analyzed in a manner similar to the analysis of the X coordinates of the frame points. Referring to FIG. 9b, at block 340 a Y master coordinate is designated at a Y coordinate of a frame point which is a Y extreme or a Y local extreme. At block 345 a Y master coordinate is also designated at a Y coordinate of a frame point if that frame point is an end point of a horizontal or almost horizontal line of the frame. Preferably an almost horizontal line has a range of 5:1 to 20:1.

At block 350, Y master segments are formed from Y master coordinates by extending horizontally away from the frame point corresponding to the Y master coordinate in a direction to the fight and left of the frame point. The end points of the segment extend until each end of the segment is a predetermined vertical distance away from a side of the frame which extends in the right direction away from the master coordinate if the end of the segment extends to the right, and the side of the frame which extends away from the Y master coordinate in the left direction if the end point of the Y master segment extends to the left.

At block 355, Y strokes are formed from two opposing Y master segments which horizontally overlap one another for a distance sufficient for the visual definition of a stroke. The segments are examined in order of increasing Y coordinates (i.e. bottom to top) and, in accordance with the contour convention described previously, a Y segment has an "in" color if its direction is to the left, and an "out" color if its direction is to the right. The two segments are opposing if the bottom segment has an "in" color and the top segment has an "out" color. The segments horizontally overlap one another if the X minimum coordinate value of each segment is less than the X maximum coordinate value of the opposing segment. The amount of overlap is equal to the smallest X maximum value of the two segments minus the largest X minimum value of the two segments.

Figure 10B:
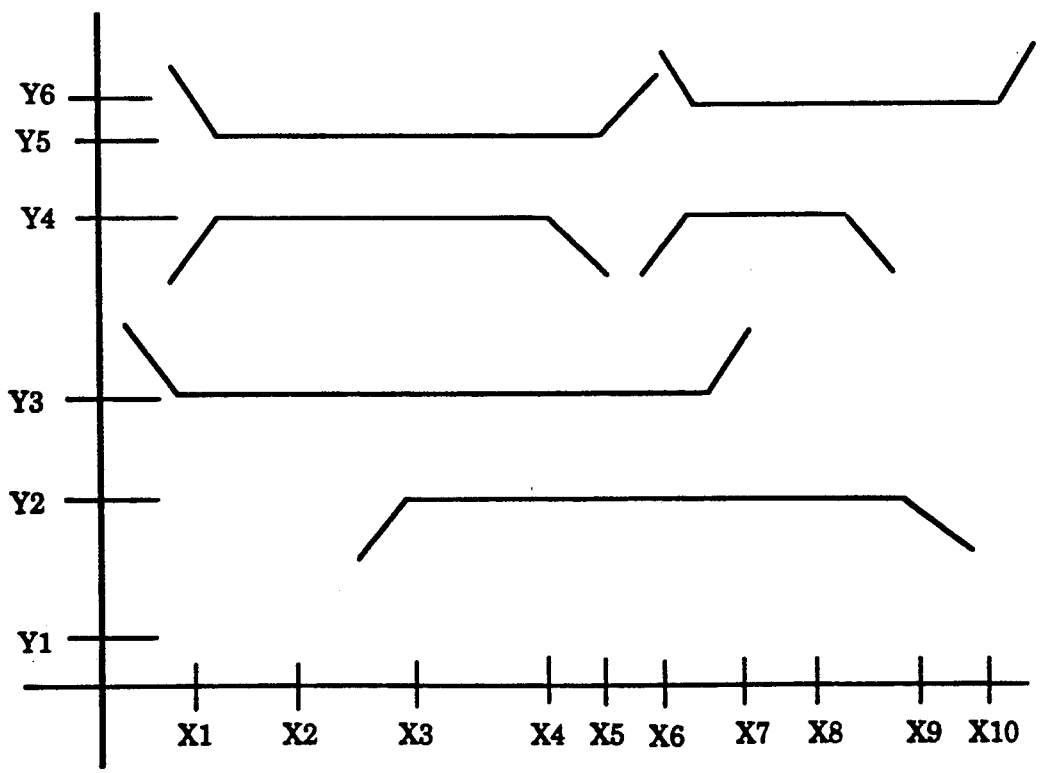
FIG. 10b illustrates Y master segments and Y strokes.

FIG. 10b illustrates the process of forming Y strokes. Five Y master segments are located at Y coordinate locations $Y_1$-$Y_5$. To determine which Y master segments form strokes, the segments are examined from the bottom Y master segment $Y_1$ to the top Y master segment $Y_5$. The segments at location $Y_1$ and $Y_2$ are first examined to determine whether the segments oppose one another. The first segment at location $Y_1$ is an "in" segment, but the second segment at $Y_2$ is also an "in" segment and not an "out" segment as is required to form opposing segments. Therefore, the next possible pairing of Y master segments at location $Y_2$, $Y_3$ is examined. The segments oppose one another because the Y master segment at location $Y_2$ is an "in" segment and the Y master segment at $Y_3$ is an "out" segment. The segments are now analyzed to determine if the segments horizontally overlap and if the segments horizontally overlap, the amount of overlap. The segments horizontally overlap because the X minimum, $X_3$, of the Y master segment at location $Y_2$ is less than the X maximum, $X_7$, of the Y master segment at location $Y_3$ and the X minimum $X_1$, of the segment at $Y_3$ is less than the X maximum $X_9$ of the segment $Y_2$ The amount of horizontal overlap is equal to:

$$MIN(X_9, X_7) - MAX(X_3, X_1) = (X_7 - X_3)$$

Since the distance $(X_7 - X_3)$ is much greater than the Y distance between segments $(Y_3 - Y_2)$, the stroke ratio is greater than 1:1 and the Y master segments at locations $Y_2$ and $Y_3$ form a stroke.

The Y master segments at locations $Y_4$ and $Y_5$ are then analyzed to determine if the two segments form a stroke. The segments form a stroke because the segment at $Y_4$ has an "in" color and the segment at $Y_5$ has an "out" color, the segments horizontally overlap one another and the amount of overlap $(X_4 - X_2)$ is larger than the distance $(Y_5 - Y_4)$ between segments that the stroke ratio is greater than 1:1.

After the Y strokes are determined, at block 360, FIG. 9b, the Y strokes are examined to determine which strokes form the Y main street. The Y main street comprises non-vertically overlapping, strong Y strokes. Each Y stroke is classified as a strong stroke or weak stroke, the strong stroke having a greater visual impact on the viewer. The strokes are evaluated in order of increasing length such that if two strong strokes vertically overlap, the longer stroke will be part of the Y main street. The Y main street reflects the most important visual elements which respect to the Y coordinates and will be the first elements adjusted. Referring to the example in FIG. 10b, the stroke formed by segments located at $Y_4$ and $Y_5$ is a strong stroke but overlaps with the strong stroke formed by segments at locations $Y_4$ and $Y_6$. Therefore, only longer stroke, the stroke formed by segments $Y_4$ and $Y_5$, will be part of the Y main street.

Typeface Adjustment Processes

Once the characters of the typeface have been analyzed, to determine visual components which form the character and the priority of importance of the components, the typeface is adjusted to minimize the visual degradation of the typeface. The frame coordinates are adjusted in order of importance, as dictated by the priority of the visual components determined during the process of analysis of the character, and are adjusted by three processes, referred to as the horizontal, vertical and diagonal adjustment processes. The horizontal adjustment process adjusts the X coordinates of the frame points describing each character and the vertical adjustment process adjusts the Y coordinates of the frame points. The diagonal adjustment process adjusts the frame points forming the diagonal strokes in the character.

As will be apparent from the following description, the adjustment of the characters of the typeface is optimized when all three processes are used together on the same set of frame points, however, these processes may be performed singularly or in conjunction with other methods of adjustment and still improve the visual characteristics of the characters of the typeface.

The horizontal adjustment process will first be described. In the horizontal adjustment process, the total width of the character, the thicknesses of strokes within a character and the thicknesses of strokes as related to the stroke thicknesses of other characters of the typeface are important visual features that are desirable to preserve.

Frequently during the adjustment process it is necessary to adjust an off grid coordinate to the nearest grid, that is pixel, position. This may be accomplished by simply rounding the coordinate value to the nearest grid position. Simple rounding presents divergence and convergence problems. Divergence problems occur when two different coordinate values, no matter how close in distance, will be rounded to different grid positions for certain scales. Inconsistent convergence occurs when two different coordinate values round to the same grid position at a given scale and to a different grid position at a smaller scale. This is visually undesirable because the visual differences should decrease as the scale decreases.

To avoid these problems, an innovative process, hereinafter referred to as the limited divergence process, is used to adjust off-grid coordinate values and off grid distances. The limited divergence process adjusts the values in the order of decreasing priority so that the adjustment of the higher priority values influence the adjustment of the lower priority values.

Figure 11A:
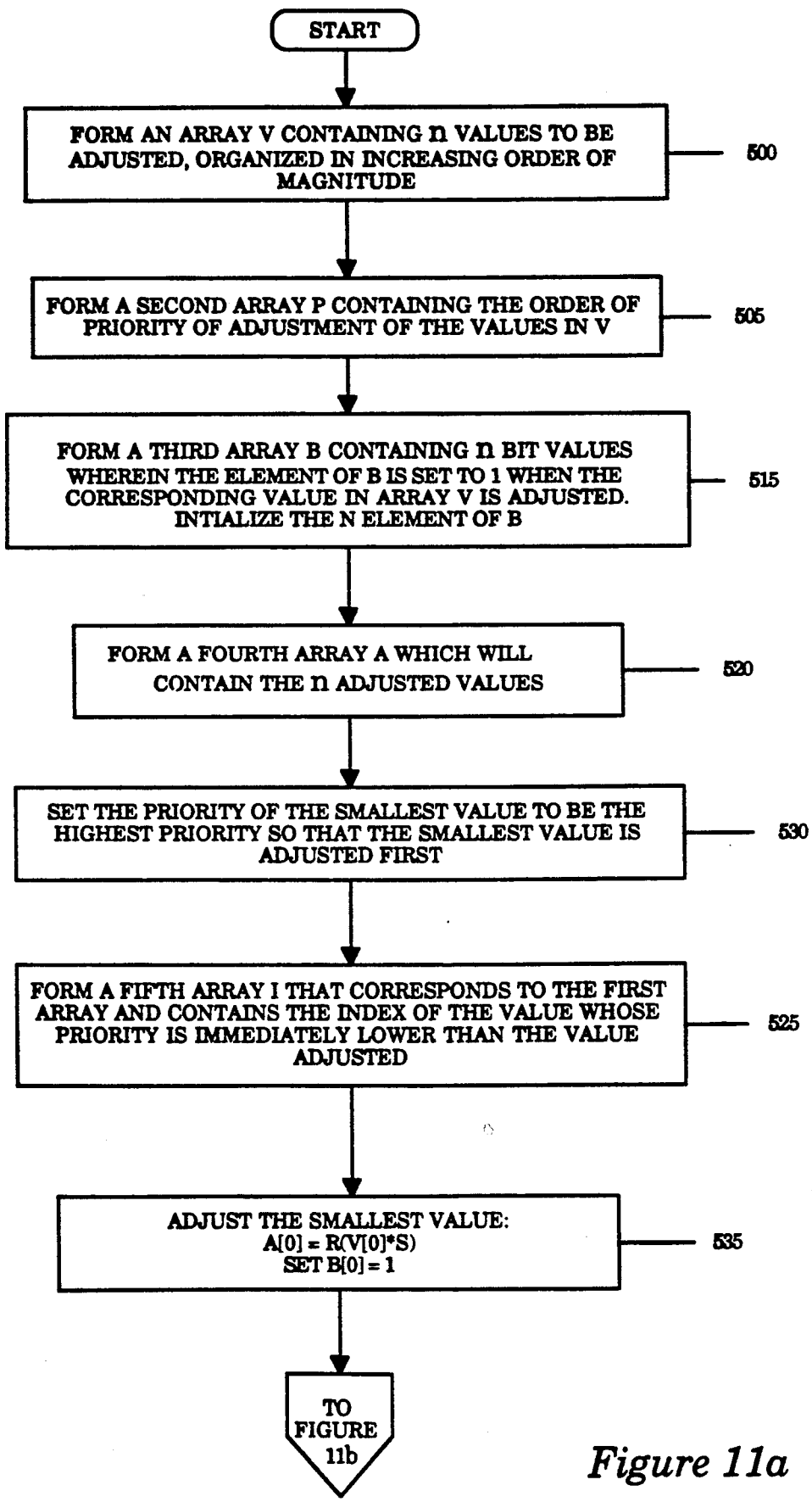
FIGS. 11a and 11b are flow charts describing the limited divergence process of the present invention.
Figure 11B:
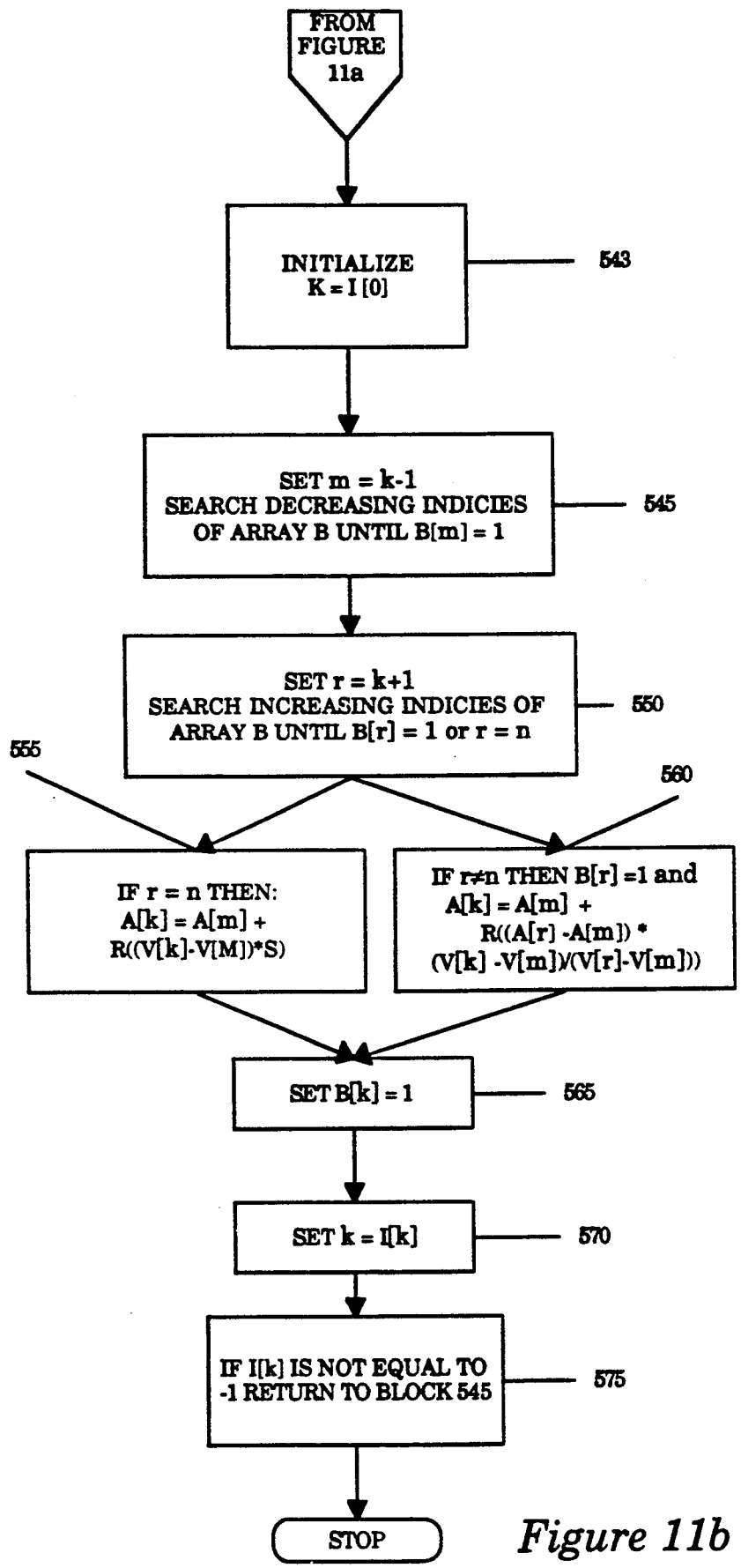

Referring to FIGS. 11a and 11b, the limited divergence process is herein described. At block 500, an array V of n elements is formed containing the values to be adjusted. The number of elements in the array, n, is equal to the number of values to be adjusted. The values are organized in the array in the order of increasing values. At block 505, a second array P is formed which corresponds to array V and contains the priority order of the values stored in V such that P[i] contains the priority order of the value in V[i]. The priority of the value is dependent upon the number of times the value occurs in the group of values. Thus, in a group of values, the values which occur more frequently are assigned the higher priorities. At block 515, a third array B of n elements is formed. Initially, the bit values in the third array B are set to zero. Once a value V[i] is adjusted the corresponding array element B[i] is set to one. At block 520 a fourth array A of n elements is formed, which corresponds to the array V and contains the adjusted values.

At block 525, a fifth array I is formed which corresponds to the first array V and contains the index of the value whose priority is immediately lower than the priority of the value currently being adjusted. The element of the array I which corresponds to the lowest priority value contains a value equal to $-1$ to indicate that there are no lower priority values.

In order for the process to work accurately, the smallest value must be adjusted first. Therefore at block 530 the priority of the smallest value is set to the highest priority. At block 535, the smallest value is adjusted according to the following equation:

$$A[0].R\ (V[0]*S)$$

Where R is a rounding function which simply rounds the value to the nearest grid position and S is the scale of the typeface. B [0] is set to 1 to indicate that the first element, which is the smallest value of all the values in the array V, has been adjusted. The index for the array, k is set to I[0]. I[0] contains the index which points to the next lowest value (V[k]) in priority.

The adjusted value of V[k] is then calculated. At block 545, m is set to equal $k-1$. A search is then initiated starting at array element B[m] and continuing by decreasing the index m of array B until an element, B[m], equals one. Thus, the array value V[m] is the largest adjusted value that is smaller than V[k]. At block 550, r is set to equal $k+1$. A search is initiated starting at array element B(r) and continuing by increasing the index of array B until B[r]=1 or r=n. If r≠n, (that is, a value B[r]=1 has been found), then V[r] is the smallest adjusted value that is larger than V[k]. If r=n, all elements of array B having an index value greater than k have been searched and no values in array V which are greater than V[k] have been adjusted.

If r=n then the adjusted value of the value f[k] is:

$$A[k]=A[m]+R((V[k]-V[m])*S)$$

Where R is a function which rounds the value in the parenthesis, (V[k]−V[m]) *S), to the nearest grid position and S is the scale. If r≠n, B[r]=1 and the adjusted value of V[k] is equal to:

$$A[k]=a[m]+R((A[r-1]-a[m])*(V[k]-V[m])/(V[r]-V[m]))$$

Once the adjusted value, A[k], has been computed, at block 565, the corresponding bit value which indicates that the value has been adjusted, B(k), is set to one and at block 570, k is set to equal the value I[k] which sets the index k to the index of the value in V that is next lowest in priority. If I[k] is equal to $-1$ then the adjustment process is complete because there is no value in V that is lower in priority. If I[k] is not equal to $-1$, the process continues again at starting block 545 and proceeds in a loop from blocks 545 to 575 until I[k]=$-1$. At the completion of the limited divergence process, array A contains the adjusted values of the values stored in V.

The horizontal adjustment will now be described referring to the flow chart depicted in FIG. 12. In the horizontal adjustment process, the thickness of the X strokes is an important visual element. Therefore at block 400, the thicknesses of all the X strokes in the typeface are globally adjusted (adjusted relative to all the X strokes in the typeface) so that size relationships among the stroke thicknesses are maintained thereby regularizing the strokes. Preferably, the stroke thicknesses are adjusted relative to both the x and y stoke thicknesses of the typeface. The local divergence process is used to globally adjust the X stroke c@y thicknesses, wherein the stroke thicknesses are input to array V in order of increasing magnitude and the priority is set according to the frequency each stroke thickness Occurs in the typeface.

Once the X stroke thicknesses are globally adjusted, the highest priority visual component the X main street, is adjusted. The thicknesses of the strokes on X main street have been adjusted; therefore, at block 420, the X white space between the X main street strokes are adjusted, which determines the relative placement of the X main street strokes within each character.

The white distances are adjusted locally, with respect to the total width of the character. The global adjustment of the X main street stroke thickness may cause the character to either increase or decrease in total width. Since the width of a character is an important visual feature, it is desirable to maintain the original width of the character. The width of the character comprises the thicknesses of strokes and the X white space. Thus to maintain the original width of the character, any distortion in total width caused by the adjustment of the strokes is absorbed by adjusting the X white space. For example, if the stroke thickness as adjusted increase the total width of the character, the total X white space is decreased in order to compensate for the increase in width. The X white space is first scaled by a white space scale factor. The white space scale factor is calculated according to the following equation:

$$\frac{\text{Width} - \text{Stroke}'}{\text{White}}$$

Where "Width" is the total original character width, "Stroke" is total adjusted stroke thicknesses on X main street and "White" is the total original X white space.

The scaled X white space is then adjusted using the limited divergence process described above in order to preserve the symmetry of the size of the X white space within each character.

Although the thicknesses of the strokes are globally determined, the adjustment of the location of those strokes within the character is determined locally. At block 415, the placement of the strokes, that is the frame points of the strokes, within each character is simply determined according to the adjusted X For example, if a character consisted of 3 X main street strokes $X_1-X_2$, $X_3-X_4$ and strokes $X_1-X_2$ and $X_3-X_4$ are separated by X white space $W_1$ and strokes $X_3-X_4$ and $X_5-X_6$ separated by X white space $W_2$, the relative location of stroke $X_1-X_2$ would be at the far left of the character and the relative location of stroke $X_3-X_4$ would be equal to the adjusted thickness of stroke $X_2$ plus the adjusted X white space $W_1$. Similarly, the relative location of stroke $X_5-X_6$ would be equal to the sum of the adjusted thickness of stroke $X_1-X_2$ the adjusted X white space $W_1$, the adjusted thickness of stroke $X_3-X_4$ and the adjusted X white space $W_2$.

Figure 12:
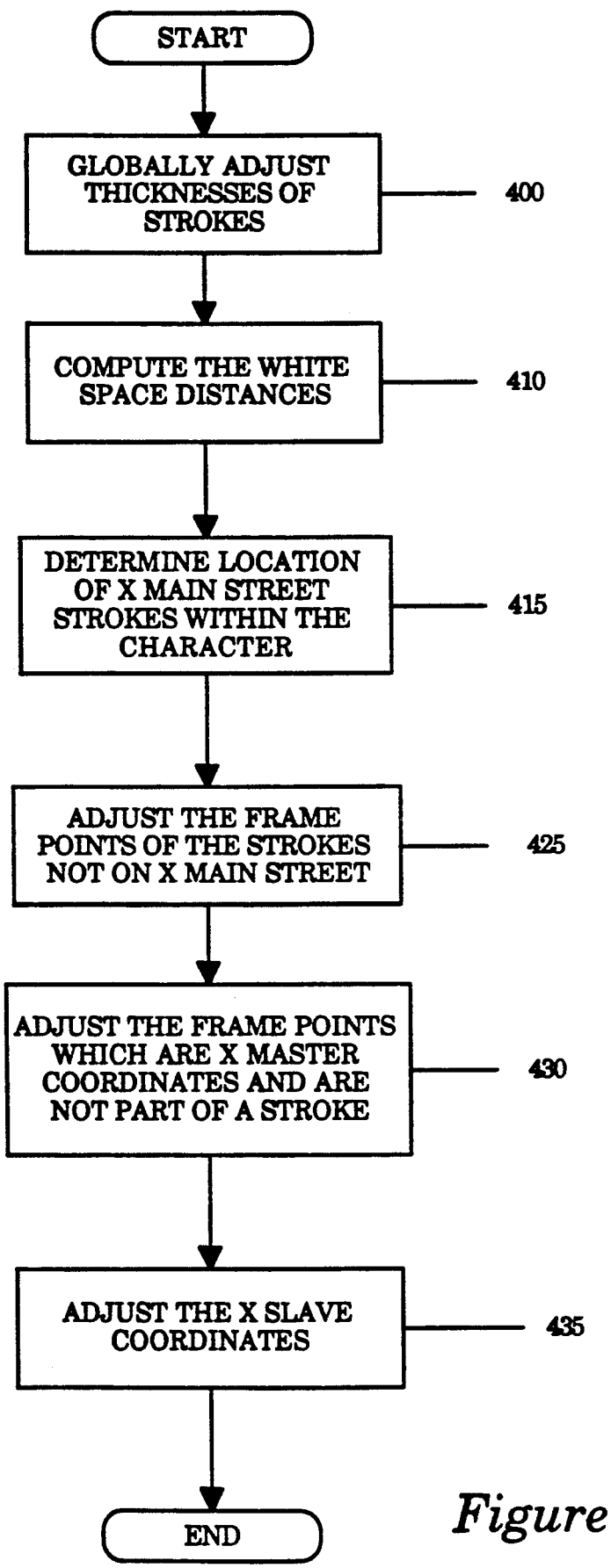
FIG. 12 is a flow chart describing the horizontal adjustment process of the present invention.
Figures 13A, 13B:
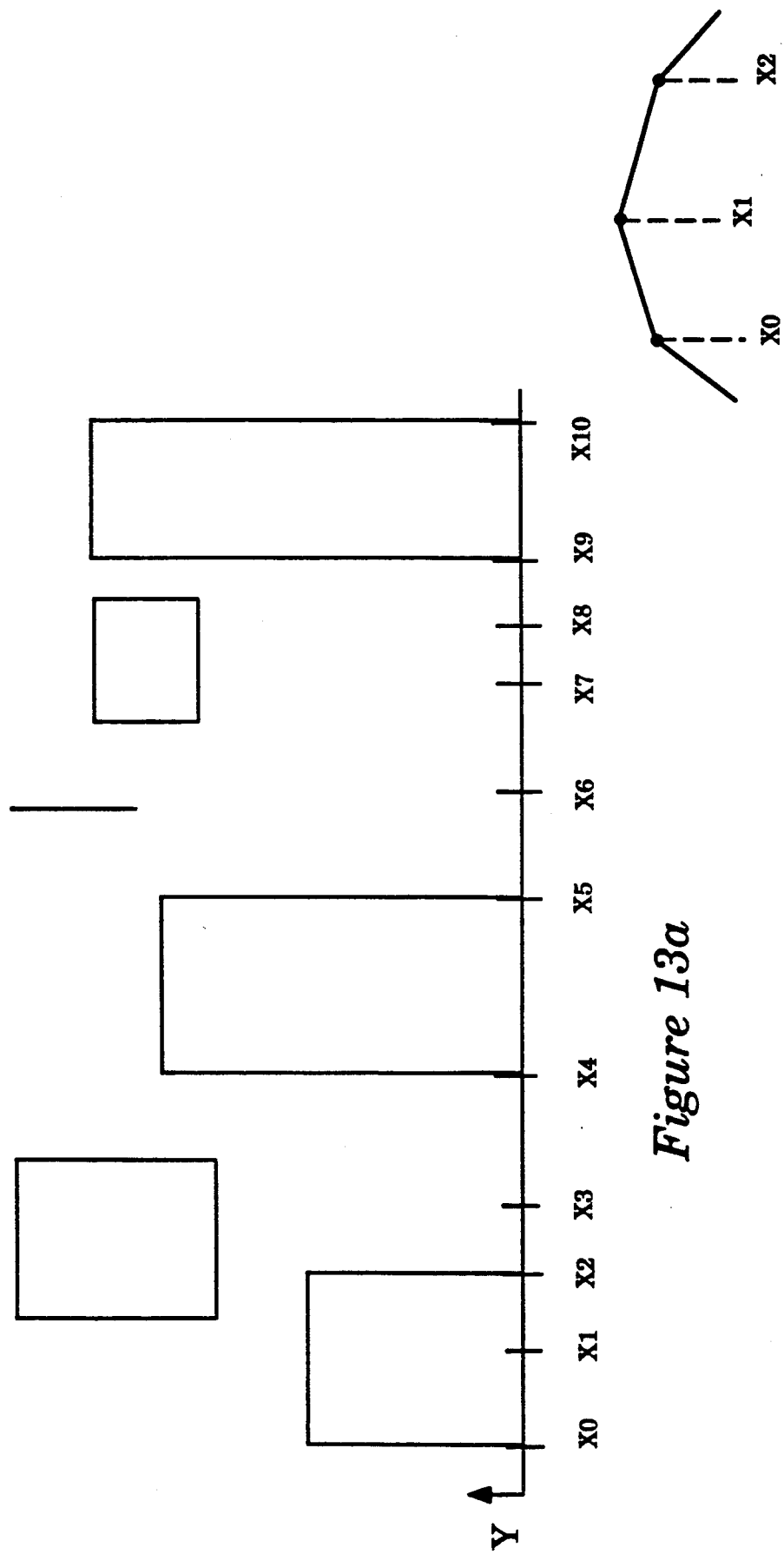
FIG. 13a illustrates the relative adjustment process of the present invention and FIG. 13b illustrates the method for adjusting slave coordinates.

After the X white space has been computed and the adjustment of the frame points of the X main street strokes is complete, referring to FIG. 12, block 425, the frame points which form the strokes not on X main street are adjusted. The weak strokes and overlapping strokes which did not make it on main street are aligned with the closest main street side and the other side is computed given the globally adjusted thickness of the stroke. The strokes are adjusted according to the following process hereinafter referred to as the "relative adjustment process". Referring to FIG. 13a, locations $X_4-X_5$, $X_1-X_3$ and $X_9-X_{10}$, identify strokes on X main street, $X_0-X_2$ and $X_7-X_8$ identify the strokes which did not make it on X main street and X6 identifies the location of a coordinate which was not used to form a stroke. The relative adjustment process is described using stroke $X_7-X_8$ as an example. First, it is determined which side or segment which forms the stroke $X_7-X_8$ is closest to a side or segment of a stroke on X main street. Therefore, in the present example the distance between the segments at locations $X_7$ and $X_5$ and the distance between the segments at locations $X_8$ and $X_9$ are compared. As can be seen from FIG. 13a, the distance between $X_8$ and $X_9$ is much shorter than the distance between $X_5$ and $X_7$. Therefore, the side $X_8$ is the segment the closest main street side and is adjusted relative to the segment at location $X_9$ of the main street stroke $X_9-X_{10}$. $X_8$ is adjusted using the following equation:

$$X_8' = X_9' - R((|X_9 - X_8|) * S_{59})$$

where R represents the function of rounding the value to the nearest grid point, $X_9'$ is the adjusted value of $X_9$ and $S_{59}$ in the scale factor between the segments at locations identified by $X_5$ and $X_9$. The scale factor functions to proportionality adjust the distances between adjusted main street strokes thereby maintaining the relative distances between main street strokes and non-main street strokes and master coordinates and main street strokes. Thus, the scale factor for the present adjustment calculation is equal to:

$$S_{59} = \frac{(X_9' - X_5')}{(X_9 - X_5)} * S$$

Wherein $X_5$ and $X_5'$ are respectively the value and adjusted value of the location of the closest X main street stroke side on the one side of the segment to be adjusted, $X_9$ and $X_9'$ are respectively the value and adjusted value of the location of the V is the closest X main street stroke side on the other side of segment to be adjusted and S is the scale of the typeface.

Once the coordinates of the first segment of the stroke, in the present example $X_8$, are adjusted, the coordinates of the other segment of the stroke, $X_7$, are simply adjusted according to thickness of the stroke which was globally adjusted. Thus, in the present example, $X_7$ is equal to the adjusted value of $X_8$ minus the adjusted thickness of the stroke.

Referring again to FIG. 12, block 430, after the non-X main street strokes are adjusted, the master coordinates of master segments which did not form strokes and the master coordinates which did not form master segments are adjusted. Each X master coordinate is aligned with the closest segment of an X main street stroke and the distance is rounded to the nearest grid position. The segment of an X main street stroke which is closest to the master coordinate is first determined. Referring to FIG. 13a master coordinate $X_6$ is closest to the segment at location $X_5$ of main street stroke $X_4-X_5$. Thus, adjusted value of $X_6$ is equal to:

$$X_6' = X_5' + R((X_6 - X_5)S_{59})$$

Where $X_5'$ is the adjusted value of $X_5$. The scale factor $S_{59}$ is again used because $X_6$ is located between the segments at locations $X_5$ and $X_9$ of strokes $X_4$-$X_5$ and $X_9$-$X_{10}$.

At block 435, FIG. 12, after all the master coordinates have been adjusted, the slave coordinates (i.e., those frame coordinates that are not X master coordinates) are adjusted. The slave coordinates are proportionately adjusted relative to the two adjacent master coordinates with respect to the frame. For example, referring to FIG. 13b, slave coordinate $X_1$ is adjusted relative to master coordinates $X_0$ and $X_2$ which are closest or adjacent to the slave coordinate $X_1$ respectively in the clockwise and counter clockwise direction along the frame. The adjusted value of the slave coordinate $X_1$ is equal to:

$$X_1' = X_0' + f*(X_2' - X_0')$$

$$f = \frac{X_1 - X_0}{X_2 - X_0}$$

Where $X'$, $X_2'$ are the adjusted values of master Coordinates $X_0$ and $X_2$.

Figure 14A:
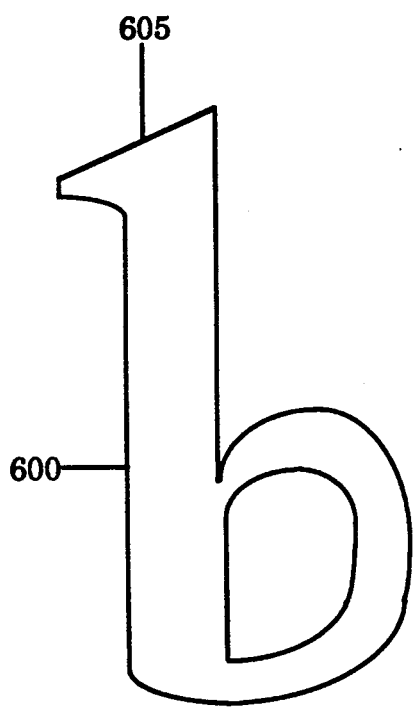
FIGS. 14(a) and 14(b) are illustrations of local extremes.
Figure 14B:
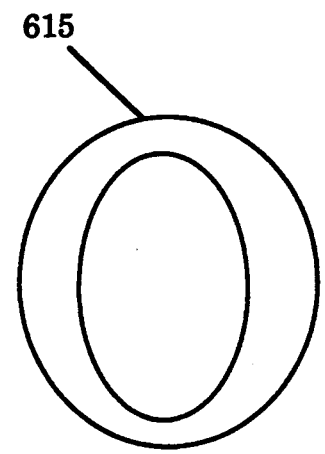

The vertical adjustment process is performed on the frame of the character to adjust the Y coordinate values of the frame points. In the vertical adjustment Process the upper and lower vertical extremes of each character (that is the tops and bottoms of character) with respect to the entire typeface is considered to be an important visual feature. Therefore it is desirable to maintain the height of each character and the vertical relationships among the characters in the typeface. It has been found that, in general, the tops and bottoms of the characters are visually in alignment with tops and bottoms of other characters of the typeface. For example, the top of most upper case characters are located in the same region. Similarly, the tops of most of the lower case characters are located in the same region. It has also been found that in many cases the local extremes of characters typically align with the extremes of other characters of the typeface. This illustrated in FIGS. 14(a)-14(b) top of the circular portion 600 of the lower case "b" is a local extreme for that portion of the character. The top extreme of the character "b" is at the top of the long vertical portion 605. It can also be seen that the top local extreme 600 in the character "b" is somewhat in vertical alignment with the top extreme of the lower case character "o" 615.

The vertical adjustment process of the present invention utilizes the above observations with respect to the vertical alignment of the characters in the typeface. The top and bottom extremes of the character are evaluated separately. Therefore any adjustments performed are performed relative to "like" data; e.g. a top segment of a character is adjusted relative only to the top extremes of other characters in the typeface and a bottom segment of a character is adjusted relative only to the bottom extremes of other characters in the typeface. Wherever possible a Y segment is adjusted using the Y alignment process described below which aligns the segment with the Y regions defined by the extremes of the characters of the typeface.

Figure 15:
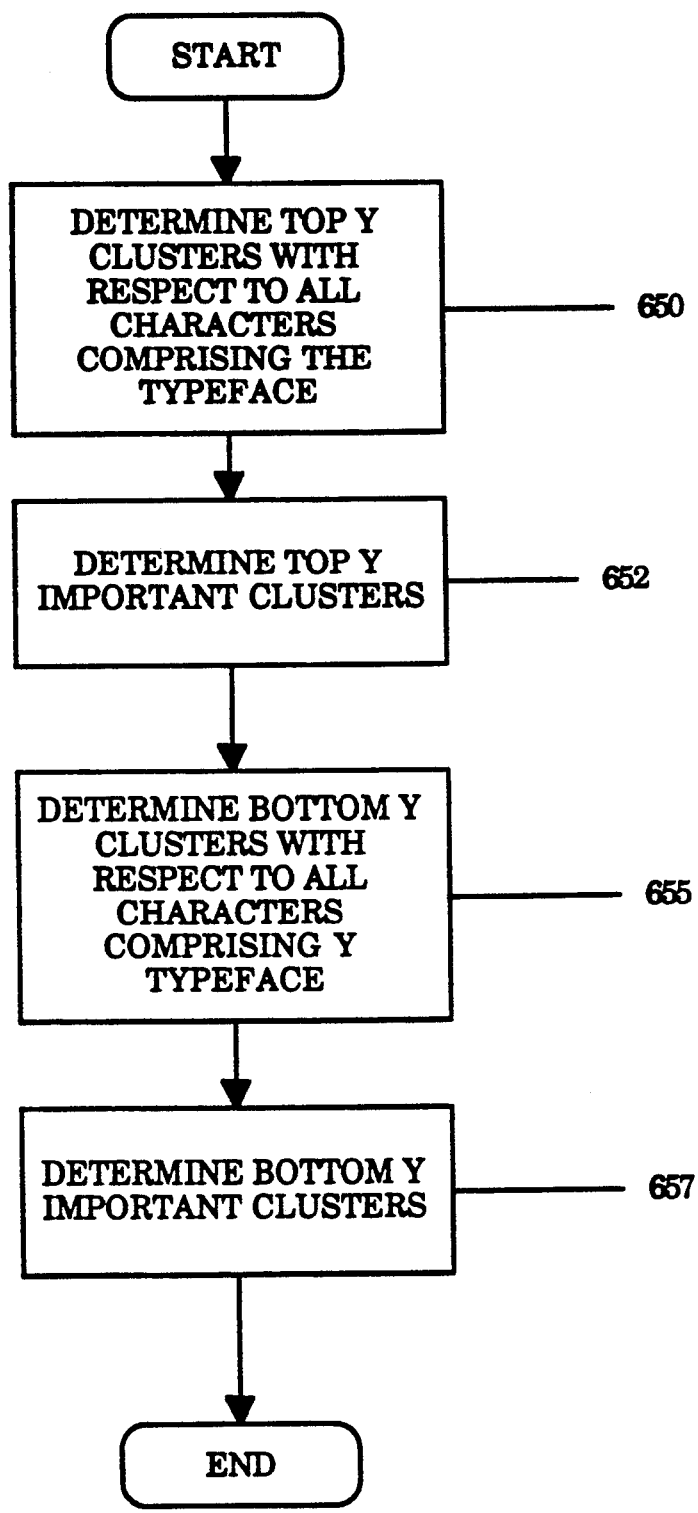
FIG. 15 is a flow chart illustrating the process of determining clusters with respect to the Y alignment adjustment process of Y coordinates.

Referring to FIG. 15, at block 650, the characters in the typeface are evaluated to determine the Y coordinate regions or "clusters" where the upper vertical extreme (i.e. top extreme) of all the characters in the typeface lie. The top clusters are determined by examining the Y coordinate values where the top extremes of the characters occur and calculating the distance between the Y coordinate values. A cluster is a set of consecutive Y coordinate values wherein no two consecutive Y coordinate values are more than a predetermined distance apart. Thus if a Y coordinate value of a top extreme is more than the predetermined distance apart from any other top extreme, a cluster comprising one top extreme is formed at that Y coordinate value. The predetermined distance indicative of a cluster should be large enough to cause the majority top extremes in a certain region reflecting, for example, the top of upper case characters to be part of a single cluster. Preferably the predetermined distance may be within range of value within the range of 0.005 to 0.01 of the sum of the ascender height and descender height of the typeface. Most coordinates representing the top extremes of the characters lie within a small quantity of clusters.

At block 652, some of the top clusters are then identified as important top clusters. The important clusters are subsequently utilized as the reference points for adjusting the vertical coordinates of the characters. A top cluster is an important top cluster if: (1) it is the extreme top cluster of all the clusters or (2) the number of top extremes which comprise the cluster is greater than or equal to a predetermined percentage of the total number of top extremes which identify the tops of the characters and contain a predetermined minimum percentage of the number of top extremes found in the largest or most important top cluster. Preferably an important cluster must contain 10 to 20% of the total number of top extremes and at least 20 to 30% of the number of top extremes in the largest top cluster.

At blocks 655 and 657, the lower vertical extremes (bottom extremes) of the characters of typeface are evaluated to determine the bottom clusters and the important bottom clusters. The clusters are determined using the same process that was used to determine the top clusters. A bottom cluster is a set of consecutive Y coordinate values of bottom extremes wherein no two consecutive Y coordinate values are more than a predetermined distance apart. The predetermined distance used to determine if two bottom extremes are part of the same cluster is preferably a value within the range of 0.005 to 0.01 of the sum of the ascender height and descender height. Following the above guidelines for forming clusters, most Y coordinates values corresponding to the bottom extremes of characters lie within a small number of clusters.

At block 657, the important bottom clusters are determined. A bottom cluster is an important bottom cluster if: (1) it is the extreme bottom cluster of all the clusters or (2) the number of bottom extremes which comprise the cluster is greater than or equal to a predetermined percentage of the total number of the bottom extremes and the cluster contains a predetermined minimum percentage of the number of bottom extremes found in the largest or most important bottom cluster. Preferably an important cluster contains 10 to 20% of the total number of bottom extremes and at least 20 to 30% of the number of bottom extremes in the largest bottom cluster.

Once the important top and important bottom clusters are formed, the Y master segments can be analyzed to determine if the Y coordinates of the the master segments can be adjusted using the Y alignment adjustment process. In order for a Y master segment be adjusted using the Y alignment process, the segment must: (1) be black convex and lie within an important cluster of the same type or (2) be the top extreme segment or bottom extreme segment of the character.

A segment is black convex if it is a top extreme or local top extreme and the segment has an "out" color direction or if the segment is a bottom extreme or local bottom extreme and has an "in" color. An example of a segment which is black convex is the top extreme of the character "O". The alignment of black convex segments is a distinctive visual feature of the characters that is desirable to preserve.

The black convex segment must also be within a cluster of the same type. Thus bottom segment must lie within an important bottom cluster and a top segment must lie within an important top cluster. A segment is a top segment if it has an "out" color. Similarly, a segment is a bottom segment if the segment has an "in" color.

The Y alignment adjustment process performs a relative adjustment of the Y coordinates to preserve the visual differences in horizontal alignment among the characters in the typeface, for example the height of characters when such a difference can be accurately expressed using the available resolution of the display device, and to eliminate the differences when the resolution becomes to coarse. The process takes into account the fact that most extremes and local extremes of the same type vertically align into the same regions.

Figure 16:
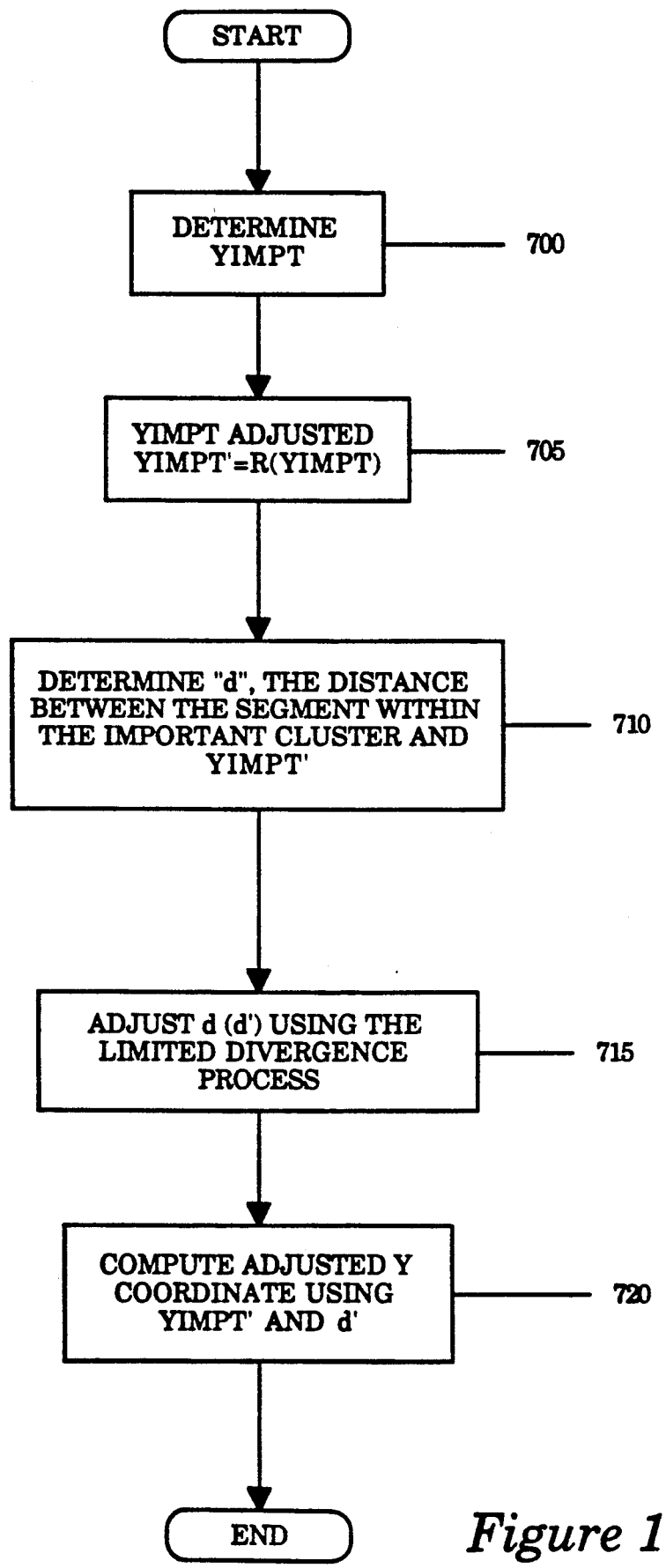
FIG. 16 is a flow chart describing the Y alignment adjustment process of the present invention.

Referring to the flow chart of FIG. 16, the Y alignment process will herein be described. At block 700, the important Y coordinate value YIMPT of the important cluster the segment lies within is determined. YIMPT is equal to the extreme top coordinate value, if the cluster is a top cluster, or the extreme bottom coordinate value of the cluster, if the cluster is a bottom cluster. At block 705, YIMPT is rounded to the nearest grid position YIMPT'. At block 710, the distance "d" between the segment in the important cluster and block 705, YIMPT is rounded to the nearest grid position to produce YIMPT. YIMPT' is determined. At block 715, the limited divergence Process is used to adjust the distance d. The values of all the distances "d" between the segments to be Y aligned and the corresponding YIMPT' values are input to the limited divergence process in order that the visual relationships among the Y segments are maintained after adjustment. At block 720, the adjusted Y coordinate value of the segment is computed. If the segment is a top segment the adjusted Y coordinate value is equal to YIMPT'−d'. if the segment is a bottom segment, the adjusted Y coordinate value is equal to YIMPT'+d'.

Figure 17A:
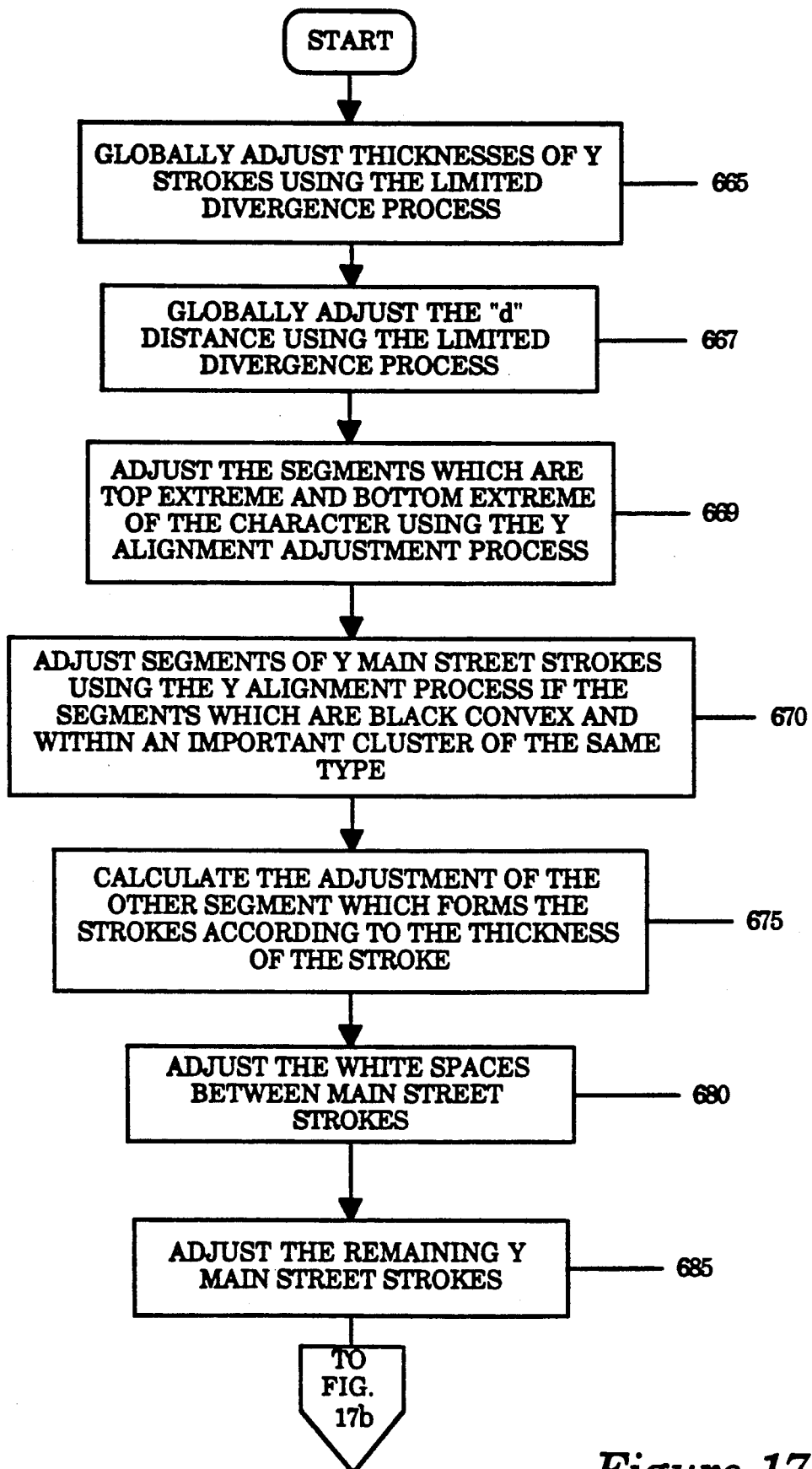
FIGS. 17a and 17b are flow charts describing the vertical adjustment process of the present invention.
Figure 17B:
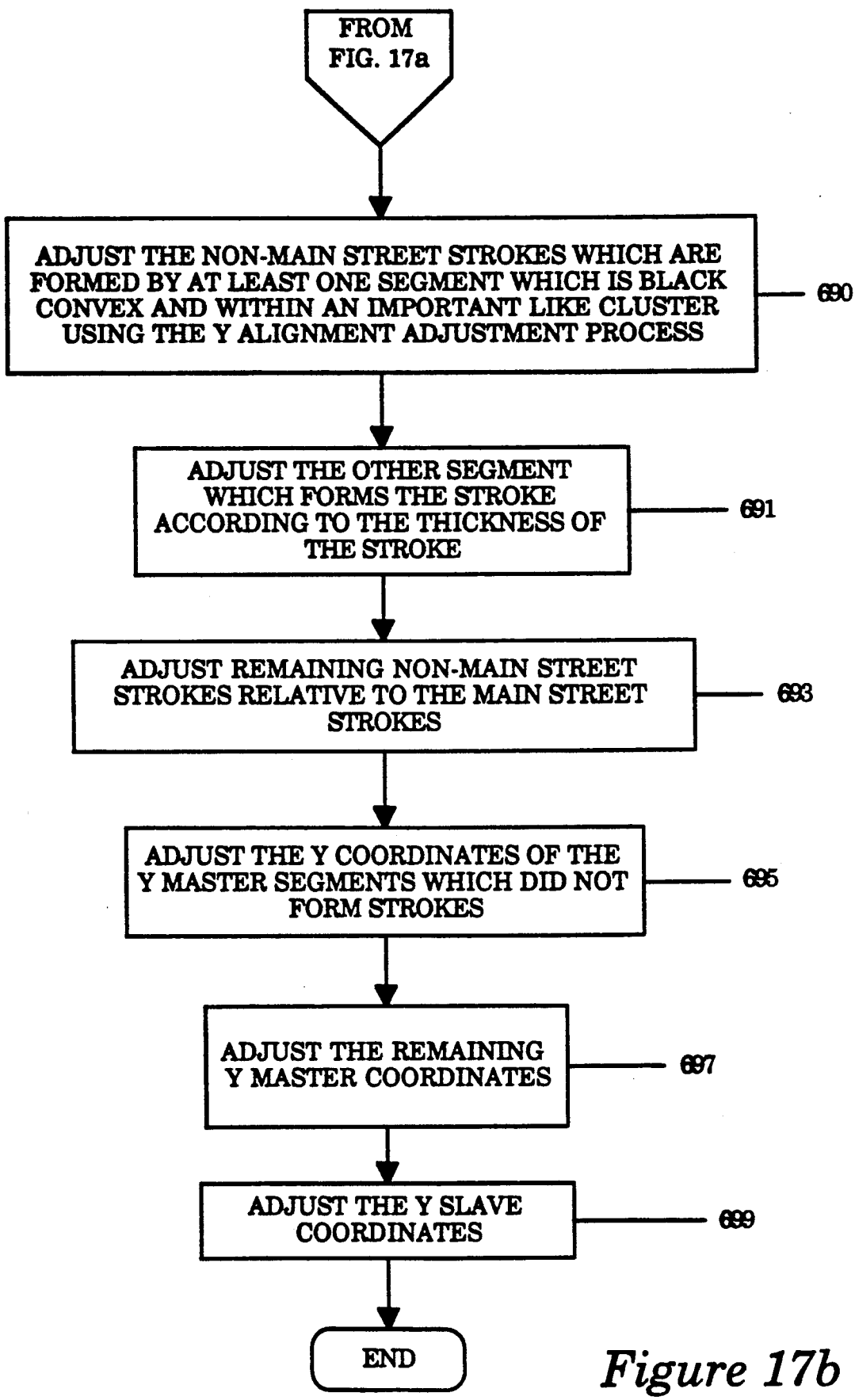
Figure 18:
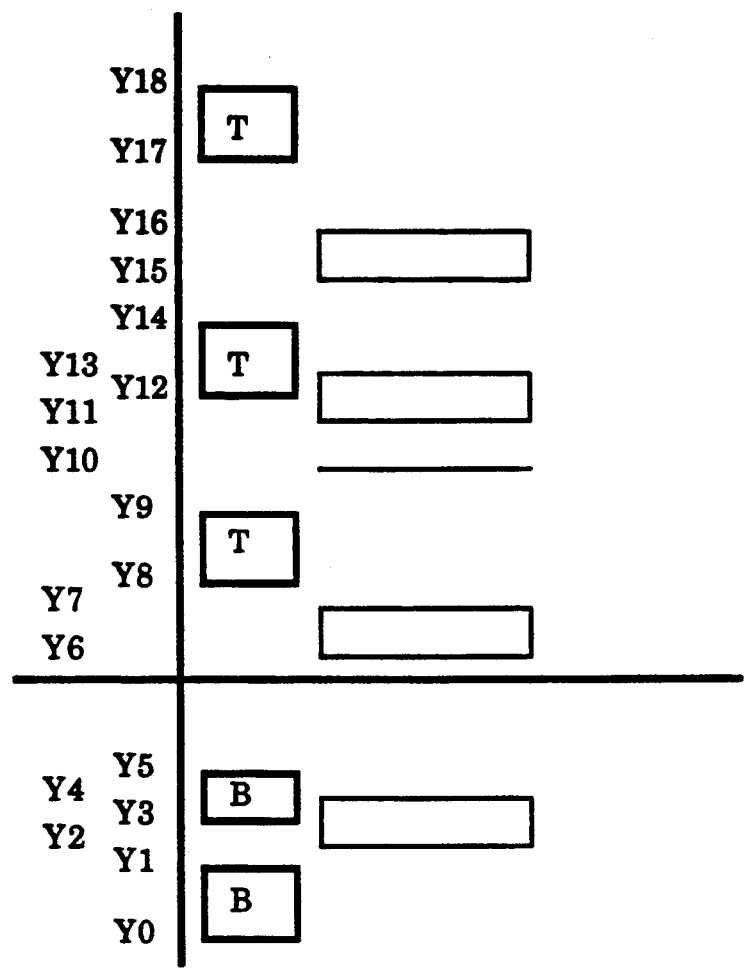
FIG. 18 illustrates the location of the clusters and strokes used to describe the vertical adjustment process of the present invention.

FIG. 18 and the flow chart of FIG. 17 will now be referenced to illustrate vertical adjustment process. Clusters $Y_0$-$Y_1$ and $Y_3$-$Y_5$ are bottom important clusters and clusters $Y_8$-$Y_9$, $Y_{12}$-$Y_{14}$ and $Y_{17}$-$Y_{18}$ are top important clusters. Assume, for the Purposes of illustration, the top segment of each stroke has an "out" color and the bottom segment of each stroke has an "in" color. Strokes $Y_2$-$Y_4$, $Y_6$-$Y_7$, $Y_{11}$-$Y_{13}$ and $Y_{17}$-$Y_{16}$ contain segments which are black convex and $Y_2$-$Y_4$, $Y_6$-$Y_7$, $Y_{11}$-$Y_{13}$, and $Y_{15}$-$Y_{16}$ are strokes on Y main street.

At block 665, the thicknesses of the Y strokes are globally adjusted using the limited divergence process. Preferably the Y strokes are globally adjusted relative to the X and Y strokes of the typeface. At block 667, the values of "d" the distance between a segment to be adjusted using the Y alignment process and the YIMPT' of the cluster the segment lies within, are globally adjusted using the limited divergence Process. The top and bottom extremes are an important visual element of each character, therefore, at block 669 the segments which are the top and bottom extremes of the character are adjusted using the Y alignment process. If the Y segments are part of a stroke, the other segment of the stroke is adjusted according to the adjusted thickness of the stroke. For example, referring to FIG. 18, the bottom extreme segment, $Y_2$, is adjusted to cluster $Y_0$-$Y_1$ using the Y alignment process. The other segment $Y_4$ of the stroke is adjusted according to the adjusted thickness of the stroke. Similarly the top extreme segment $Y_{16}$ of stroke $Y_{15}$-$Y_{16}$ is adjusted to cluster $Y_{17}$-$Y_{18}$ using the Y alignment process and the segment $Y_{15}$ is adjusted according to the adjusted thickness of the stroke. Once the Y coordinates of the top and bottom extremes are adjusted, the Y main street is adjusted.

At block 670, the segments of Y main street strokes which are black convex and within an important cluster of the same type are adjusted using the Y alignment process.

At block 675, it a segment of a stroke was adjusted by Y alignment, the other segment which forms the stroke is adjusted according to the adjusted thickness of the stroke. Thus, if the adjusted side is below the other side of the stroke, the other side of the stroke is adjusted by adding the adjusted thickness of the stroke to the adjusted Y coordinate value of the Y aligned stroke. Similarly if the adjusted side is above the other side of the stroke, the stroke is adjusted by subtracting adjusted thickness of the stroke from the adjusted coordinate value of the aligned stroke.

In the example illustrated in FIG. 18, segment $Y_{13}$ of Y main street stroke $Y_{11}$-$Y_{13}$ is black convex and within important cluster of the same type $Y_{12-14}$. Therefore the Y frame coordinate of the segment $Y_{13}$ is adjusted using the Y alignment adjustment process. The other segment which forms the stroke, $Y_{11}$, is adjusted according to the adjusted thickness of the stroke.

The remaining Y main street strokes are adjusted using the Y white space. Therefore the Y white space needs to be adjusted. At block 680, those white spaces between the adjusted Y main street strokes and unadjusted main street strokes are adjusted. The Y white space is first scaled by multiplying the white space by the white scale factor which is equal to:

$$\frac{Ydist - Stroke'}{White}$$

Where Ydist is the original total Y distance from the bottom to the top of the character, Stroke' is the total thickness of the adjusted strokes and White is the total original Y White space.

The scaled Y white space is then adjusted locally, using the limited divergence process described earlier in this document. However, it is necessary to scale only the Y white space to be used in order to adjust the strokes. If N number of strokes are contained between two fixed positions, then N+1 white spaces bound the sides of the strokes and only N white spaces are needed to position the strokes. All the Y white spaces but the largest Y white space are adjusted because the largest Y space is visually the least sensitive to a change in dimension. By default, the largest white space will then be equal to the difference of the total Y distance and the sum of the adjusted stroke thicknesses and Y white space.

At block 685, the strokes on Y main street which could not be adjusted by Y alignment are adjusted relative to the adjusted strokes and Y white space, using the relative adjustment process described earlier in this document. Thus, in the example shown in FIG. 18, Y main street stroke $Y_6$-$Y_7$ is adjusted. First it is determined that segment which forms the stroke, $Y_6$ or $Y_7$, is closest to an adjusted main street stroke. In this example, the distance between $Y_{11}$ and $Y_7$ is compared to the distance between $Y_6$ and $Y_4$. Because the distance between $Y_6$ and $Y_4$ is less than the distance than between $Y_7$ and $Y_{11}$ the stroke side $Y_6$ will be aligned relative to stroke side $Y_4$ using the following calculation:

$$Y_6' = U_4' + R((Y_6 - Y_4) * S_{411})$$

where $Y_4'$ is the adjusted value of segment $Y_4$ and $S_{411}$ is the scale between main street segments $Y_4$ and $Y_{11}$. The other side of stroke $Y_7$, is adjusted by adding the adjusted thickness of the stroke to the adjusted value of $Y_6$.

Once all the strokes on Y main street are adjusted, the segments of the strokes which did not make it on Y main street are adjusted. Referring back to FIG. 17b, block 690, the segments of strokes not on Y main street, which are black convex and within an important cluster of the same type, are adjusted using the Y alignment adjustment process. Similarly, at block 691, the segments which form the other sides of the strokes are adjusted according to the adjusted thickness of each stroke.

At block 693, the remaining non-Y main street strokes are adjusted relative to the adjusted Y main street strokes using the relative adjustment process.

Once all the strokes have been computed, at block 695, the Y master coordinates of Y master segments which did not form strokes are adjusted. If the Y master segment is black convex and within an important cluster of the same type, the segment is adjusted using the Y alignment adjusted process. Otherwise the Y master coordinate of the segment is adjusted relative to the adjusted Y main street strokes using the relative adjustment process. For example, master coordinate $Y_{10}$ in FIG. 18 would be adjusted relative to $Y_{11}$, the closest Y main street side using the following equation:

$$Y_{10}' = Y_{11}' - R((Y_{11} - Y_{10}) * S_{711})$$

Where $Y_{11}'$ is the adjusted value of $Y_{11}$, R is a round-off function which rounds the value to the nearest grid position and $S_{711}$ is the scale between Y main street strokes sides 7 and 11, the two closest segments to $Y_{11}$.

At block 697, any remaining Y master coordinates are adjusted relative to the adjusted Y main street strokes using the relative adjustment process.

At block 699, the Y slave coordinates are adjusted. The Y slave coordinates are adjusted relative to the two master coordinates, which are adjacent to the slave coordinate with respect to the frame. The slave coordinates are adjusted in the same manner as the X slave coordinates using the process described with respect to FIG. 13b.

At this point in the process the adjustment of frame coordinates in the horizontal and vertical direction have been described. However, there are important visual features which are not oriented in the vertical or horizontal direction which should be preserved in order to minimize degradation of the character. For example, it is desirable to maintain the relative thicknesses of diagonal strokes such as the diagonal strokes in the letter "N" or the letter "ΘW". In order to insure that these important visual features are preserved, the frame coordinates of the characters which form diagonal strokes are also adjusted.

Figure 19:
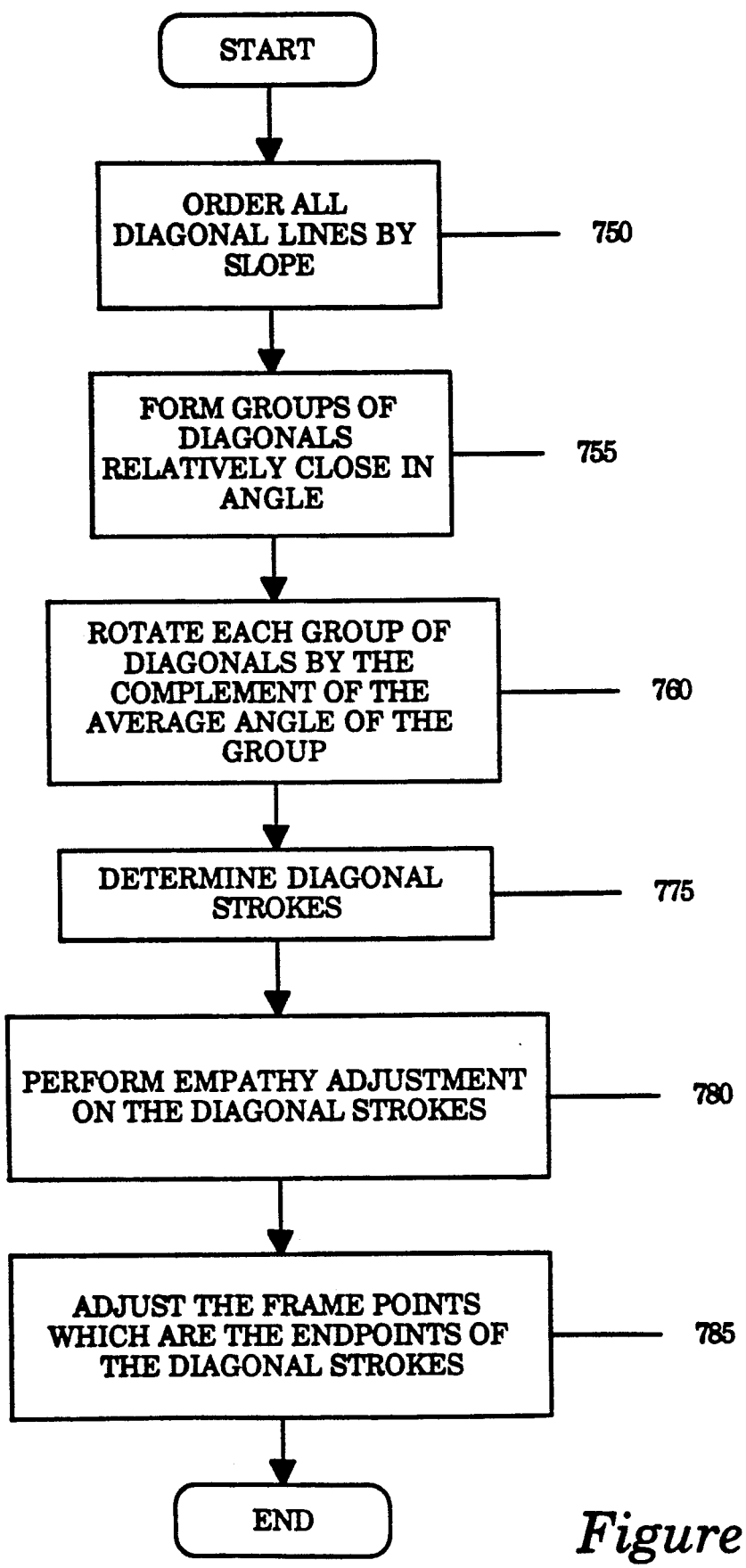
FIG. 19 is a flow chart which describes the diagonal adjustment process of the present invention.

Referring to FIG. 19, at block 750, the diagonal lines are ordered according to slope. A diagonal line is any line which is not a horizontal or almost horizontal line or a vertical or almost vertical line. At block 755, groups are formed of diagonals which are relatively close in angle. The size of the range of the group should not be too big that it encompasses a large number of diagonal segments, but the range should not be so small but that the groups only include those segments that are parallel. Preferably the diagonal lines are grouped in ranges which vary from 10 to 20 degrees. Most preferably the lines are grouped together in 10 degree ranges.

At block 760, the diagonal lines are rotated so that they appear as vertical lines. To rotate the lines, the angles in each group are averaged and each diagonal line in the group is rotated by the complement of the average angle of the group. The rotation of the diagonal segments result in vertical or almost vertical segments, from which the diagonal strokes can simply be determined.

At block 775, the rotated diagonal segments are analyzed to determine if the segments form diagonal strokes. The requirements for forming the strokes are the same requirements for forming X strokes discussed earlier; thus a stroke is found where two opposing segments, the first segment having an "in" color and the second segment having an "out" color, vertically overlap for a distance sufficient for the visual definition of the stroke.

Once the diagonal strokes have been determined, at block 780 the thicknesses of the diagonal strokes are adjusted. This is performed using a process herein referred to as "empathy adjustment". In the empathy adjustment process, the thickness of the diagonal stroke is compared to the stroke thicknesses of the X and Y strokes to find a vertical or horizontal stroke thickness that is close to or equal to the diagonal stroke thickness. If a vertical or horizontal stroke thickness is equal to the diagonal stroke thickness, the adjusted thickness of the diagonal stroke is equal to the adjusted thickness of that horizontal or vertical stroke. If the diagonal stroke thickness is not equal to a horizontal or vertical stroke thickness, the two closest thickness values, the closest thickness value greater than the diagonal stroke thickness and the closest thickness value less than the diagonal stroke thickness, are used to compute the adjusted thickness of the diagonal stroke according to the following equation:

$$TD' = TL' + (TR' - TL') * t$$

$$t = \frac{(TD - TL)}{(TR - TL)}$$

Where TD is the thickness of the diagonal stroke, TL is the closest stroke thickness less than TD, TR is the closest stroke thickness greater than TD, and TD', TL', TR' respectively are the adjusted thicknesses of TD, TL and TR.

Figure 20:
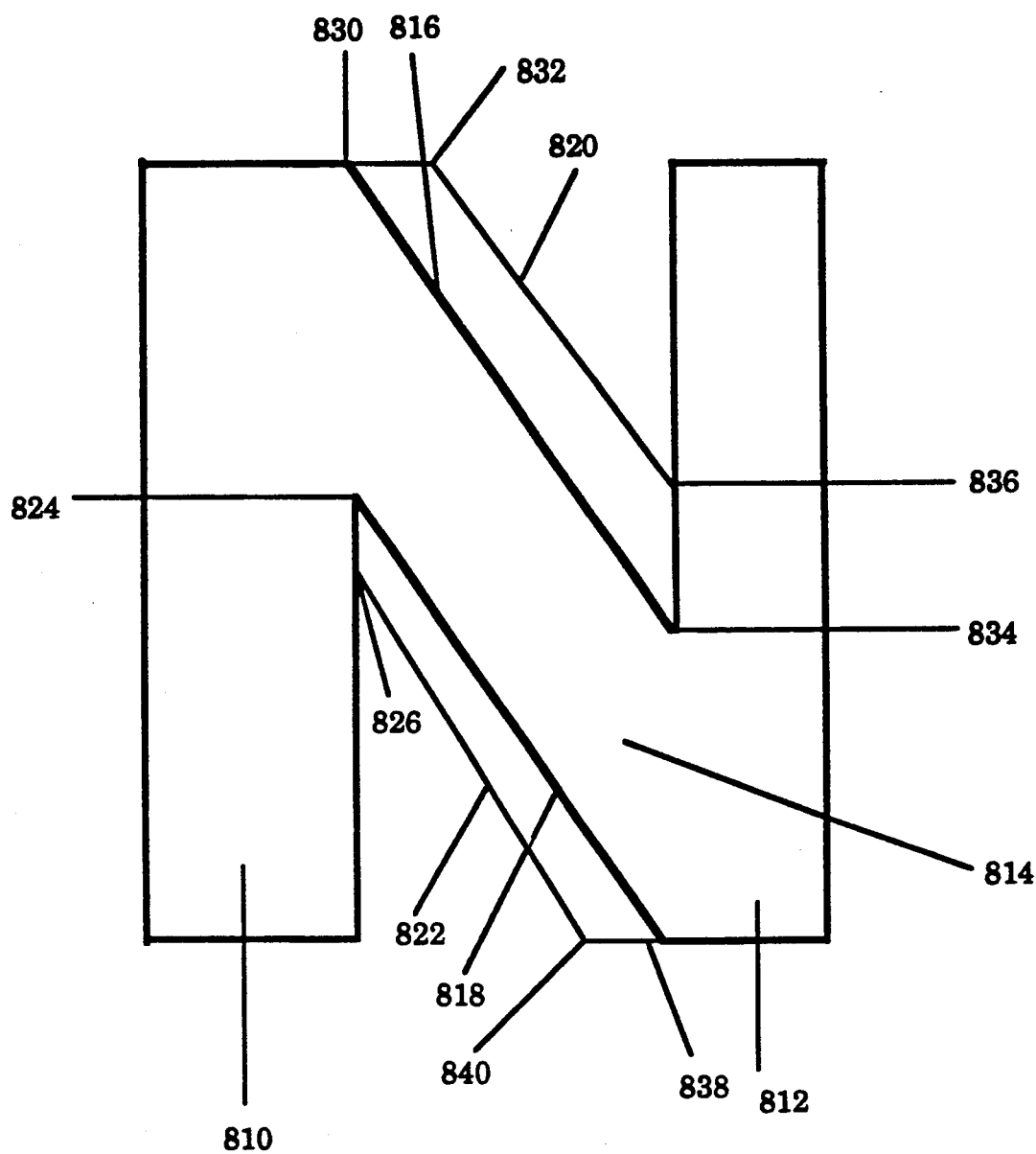
FIG. 20 illustrates the adjustment of a diagonal stroke in the character "N".

The frame points are adjusted by displacing each segment of the diagonal stroke by one-half of the amount the stroke is adjusted, ½ (TD'−TD). However, the diagonal stroke cannot be modified by simply displacing the segments by ½ (TD"−TD). The end points of the diagonal stroke must be adjusted in such a manner that the thicknesses of the adjusted adjacent strokes are maintained. In order to preserve the thicknesses of the adjacent strokes, the frame points at the intersection of the adjacent stroke and the diagonal stroke are displaced along a segment of the adjacent stroke. This is illustrated in FIG. 20. For purposes of illustration, the letter N is broken down into 3 strokes, X strokes 810, 812 and diagonal stroke 814. Using the empathy adjustment process, the thickness of diagonal stroke 812 is to be increased by an amount W. Therefore segments 816 and 818 are each displaced by the amount W/2 to locations shown as 820 and 822. To maintain the thickness of strokes 810, frame point 824 is adjusted to point 826 and frame point 830 is adjusted to point 832. Similarly, to preserve the thickness of stroke 812, frame point 834 is adjusted to point 836 and frame point 838 is adjusted to 840.

Each frame point is adjusted individually. The type of frame point adjustments performed can be broken down into 4 cases. Case 1 is the adjustment of a frame point which is preceded by a segment to be adjusted and followed by segment that is not to be adjusted. In other words, the frame point connects a first segment that is to be adjusted to a second segment that is not to be adjusted. Case 2 is the adjustment of a point preceded by a segment that is not to be adjusted and followed by a segment that is to be adjusted. Case 3 is the adjustment of a point between segments that are both to be adjusted, but adjusted by different amounts. Case 4 is the adjustment of a point between segments which are both to be adjusted by the same amount.

Figure 21A:
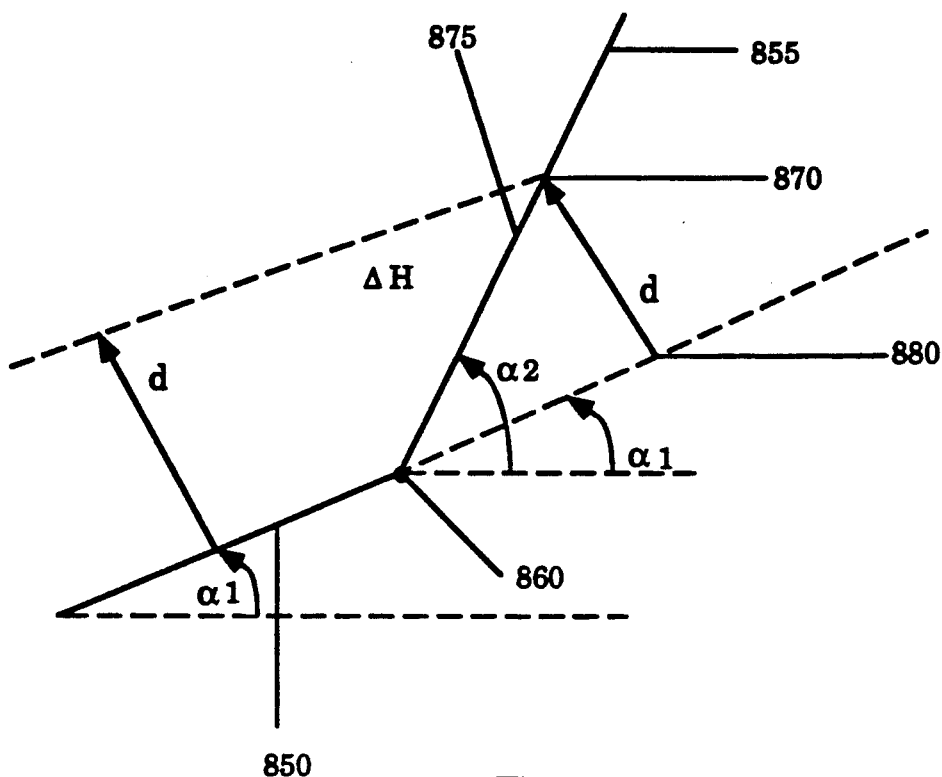
FIG. 21a-21d illustrate the adjustment of the frame points of diagonal strokes according to the present invention.

The geometry of the first case is illustrated in FIG. 21a. Line 850 represents the segments of a diagonal stroke to be adjusted. Line segment 855 is the adjacent segment which is not to be adjusted. The frame point of the stroke which requires adjustment is identified at 860. In the present example, line 850 is to be moved a distance d to adjust the diagonal stroke. Therefore frame point 860 must be moved along segment 855 to point 870. By adjusting frame point 860 to 870 the thickness and orientation of the stroke formed by segment 855 are preserved.

The adjusted control point 870 is determined according to the following process. From the frame points we can determine the angles $\alpha 1$ and $\alpha 2$. Using the known values $\alpha 1, \alpha 2$ and the distance d, the new point 870 can be calculated using trigonometric functions. The length of the hypotenuse 875 of the triangle formed by the vertices frame point 860, new frame point 870 and point 880 is calculated according to the equation:

$$\Delta H = \frac{d}{\sin(\alpha 2 - \alpha 1)}$$

Once $\Delta H$ 875 is calculated, the $\Delta X$ and $\Delta Y$, which must be added to the coordinates of frame point 860 to determine the adjusted coordinate 870, are calculated according to the following equations:

$$\Delta X = \Delta H * \cos(\alpha 2)$$

$$\Delta Y = \Delta H * \sin(\alpha 2)$$

Figure 21B:
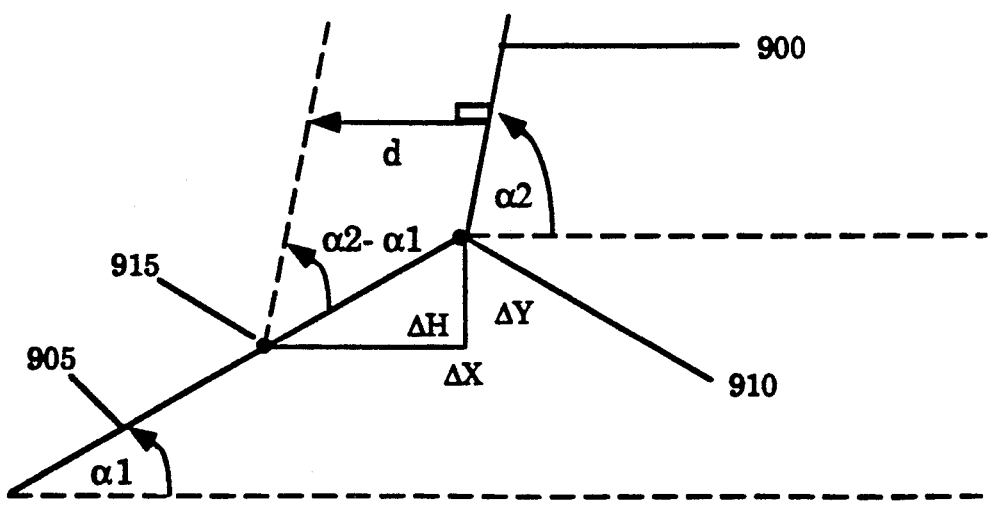

Case 2, which is the case illustrated in FIG. 21b, is the adjustment of a point preceded by a segment that is not to be adjusted and a segment to be adjusted. Segment 900 identifies the diagonal segment that is to be adjusted a distance d. The adjacent segment 905 is not to be adjusted. In the present example we again know from the frame points the angles $\alpha 1$ and $\alpha 2$. Using that information we can calculate $\Delta H$ which is equal to:

$$\Delta H = \frac{d}{\sin(\alpha 2 - \alpha 1)}$$

$\Delta X$ and $\Delta Y$, which are added to coordinate point 910 to result in adjusted point 915, are calculated using the following equations:

$$\Delta X = -\Delta H * \cos(\alpha 1)$$

$$\Delta Y = -\Delta H * \sin(\alpha 1)$$

Figure 21C:
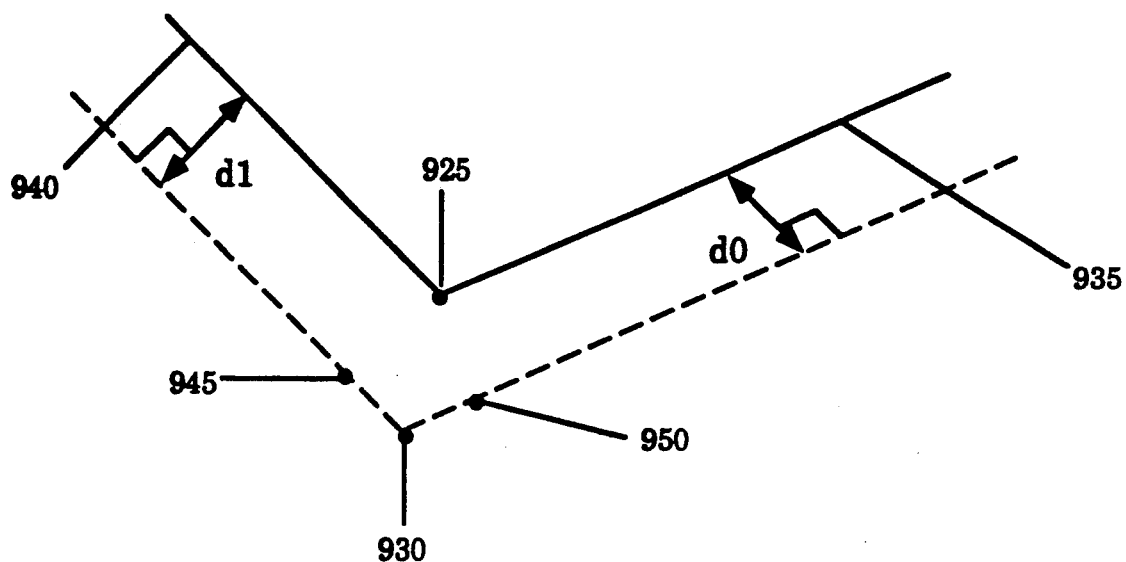

FIG. 21c illustrates case 3, the adjustment of a point between two segments that are both to be adjusted, but adjusted by different amounts. Referring to FIG. 21c, frame point 925 is to be adjusted to point 930 in order to adjust segment 935 a distance d0 and to adjust segment 940 a distance d1. In order to calculate the adjusted coordinate 930 two sets of calculations are performed. $\Delta X_1$ and $\Delta Y_1$ are first calculated to determine theoretical adjusted point 945 where the frame point 925 is a case 1 segment, that is, a frame point preceded by line 940 to be adjusted, a distance d1, followed by a line not to be adjusted, line 935. $\Delta X_2$ and $\Delta Y_2$ are calculated to determine a second theoretical adjusted point 950 wherein the frame point 925 is a case 2 calculation, that is, a frame point is preceded by a line 940 not to be adjusted followed by a line 935 to be adjusted a distance d0. The points 925, 950, 945 and 930 form a parallelogram; therefore the adjusted point 930 is equal to:

$$X' = X + \Delta X_1 + \Delta X_2$$

$$Y' = Y + \Delta Y_1 + \Delta Y_2$$

Figure 21D:
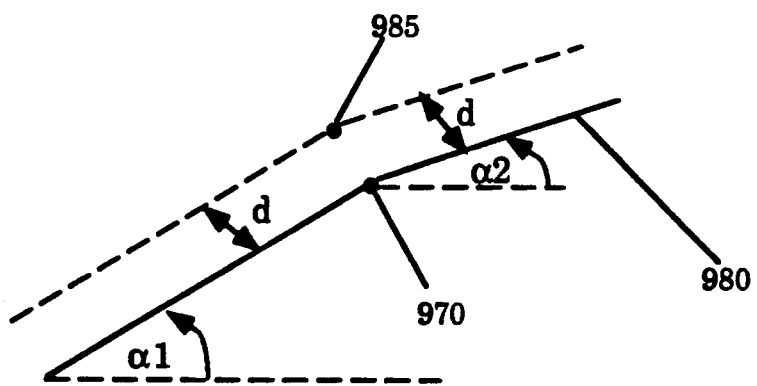

Case 4 is a point preceded and succeeded by lines in which both lines are adjusted by the same amount. Referring to FIG. 21d control point 970 is preceded by line 975 and followed by line 980. Both line 975 and line 980 are displaced a distance d. Therefore, control point 970 must be adjusted by an amount $\Delta X$ and $\Delta Y$ to result in adjusted point 985. This is achieved using the following equation:

$$\Delta X = \frac{d * \cos(\alpha 1)}{\sin(\alpha 2 - \alpha 1)}$$

Where TD is the thickness of the diagonal stroke and TD' is the adjusted thickness of the diagonal stroke and $\alpha 1$ and $\alpha 2$ are determined from the frame of the character.

$\Delta Y$ is similarly determined by the following equation:

$$\Delta Y = \frac{d * \sin(\alpha 1)}{\sin(\alpha 2 - \alpha 1)}$$

Once the diagonal adjustment process is complete the frame points representing each of the characters are adjusted and the control points for each character are adjusted according to adjusted frame points using the linear transformations described earlier in this document.

The invention has been described in conjunction with the preferred embodiment. Numerous alternatives, modifications, variations and uses will be apparent to those skilled in the art in light of the foregoing description. For example, the horizontal, vertical and diagonal adjustment processes may be used independently, in conjunction with one another or in conjunction with other adjustment processes. Similarly, the process of analyzing the character and determining the important visual components may be used with other adjustment processes not described herein. In addition, the processes or portions of processes that do not require the input of the scale can be executed independently of those processes that require input of the scale. For example, the process of analyzing the characters of the typeface to determine the important visual components may be a separate process which is executed once for any typeface. The output data generated may be stored in a intermediate data format and retrieved whenever necessary to generate the typeface. This decreases the amount of computation time required because the analysis process is executed only once for any given typeface. The output of the analysis process may then be used in conjunction with the horizontal, vertical and diagonal adjustment processes to generate the adjusted typeface for a given scale. If the typeface is to be adjusted to another scale, the same output from the analysis process may be retrieved and used again with the horizontal, vertical and diagonal adjustment processes to generate an adjusted typeface for that scale.

What is claimed is:

1. In a computer system comprising a display for displaying characters of a digital typeface, wherein the typeface is generated for a particular scale and each character of the typeface is generated for a particular scale and each character of the typeface is described in a format using control points comprising X-Y coordinate pairs, a method for minimizing the visual degradation of the characters of the typeface, said method comprising the steps of:

forming a frame for each character from said control points, said frame represented by a plurality of frame points comprising X-Y coordinate pairs;

determining vertical strokes which comprise each character, said strokes formed by a plurality of frame points and identified as X strokes;

determining horizontal strokes which comprise each character, said horizontal strokes formed by a plurality of frame points and identified as Y strokes;

adjusting the X coordinates of the frame points for each character of the typeface representative of X strokes, said X strokes being oriented in the vertical direction and prioritized in order of visual importance to the character, said strokes being adjusted according to priority wherein the amount of adjustment of the lower priority strokes is dependent upon the higher priority strokes, and adjustment regularizing the thicknesses of the X strokes and preserving the width of the character; adjusting the X coordinates of the frame points which do not form a stroke, said adjustment dependent on preserving the width of the character and the thicknesses of adjusted X strokes;

adjusting the Y coordinates of the frame points for each character of the typeface representative of Y strokes, said Y strokes being oriented in the horizontal direction and prioritized in order of visual importance to the character, said strokes being adjusted according to thepriority wherein the amount of adjustment of the lower priority strokes is dependent upon the thicknesses of the higher priority strokes, said adjustment preserving the heights of the characters of the typeface and the horizontal alignment of the Y strokes; and adjusting the Y coordinates of the frame points which do not form a stroke, said adjustment dependent on preserving the height of the character and the thicknesses and the horizontal alignment of the adjusted strokes;

whereby the important visual features of the characters of the typeface are maintained thereby minimizing the visual degradation of the typeface.

2. The method according to claim 1 further comprising:

determining diagonal strokes comprising each character which are oriented in the diagonal direction, said strokes formed by a plurality of frame points;

adjusting the frame points of each character of the typeface representative of the diagonal strokes, said adjustment dependent on preserving the adjusted thicknesses and locations of the adjusted X and Y strokes.

3. The method of claim 1 wherein the frame is formed in such a manner that there is a straight line segment for every horizontal tangent, vertical tangent, straight line segment, tangent of an inflection point and tangents at a slope discontinuity, said segments connected by weight segments.

4. The method of claim 1 wherein the step of adjusting the X coordinates of the frame points which do not form a stroke comprises aligning each X coordinate with the closest side of a main street stroke and rounding the coordinate value to the nearest grid position.

5. In a computer system comprising a display for displaying characters of a digital typeface, wherein the typeface is generated for a particular scale and each character of the typeface is described in a format using control points comprising X-Y coordinate pairs, an apparatus for implementing a method for minimizing the visual degradation of the characters of the typeface, and apparatus comprising:

means for executing a program routine to form a frame for each character from said control points, said frame represented by a plurality of frame points comprising X-Y coordinate pairs, said frame points forming a polygon having determinable geometric relationships with said control points based on said coordinates;

means for executing a program routine to determine vertical strokes which comprise each character, said strokes formed by a plurality of frame points and identified as X strokes;

means for executing a program routine to determine horizontal strokes which comprise each character, said horizontal strokes formed by a plurality of frame points and identified as Y strokes;

means for executing a program routine to adjust the X coordinates of the frame points for each character of the typeface representative of X strokes, said X strokes being oriented in the vertical direction and prioritized in order of visual importance to the character, said strokes being adjusted according to priority wherein the amount of adjustment of the lower priority strokes is dependent upon the higher priority strokes, said adjustment regularizing the thicknesses of the X strokes and preserving the width of the character.

means for executing a program routine to adjust the X coordinates of the frame points which do not form a stroke, said adjustment dependent on preserving the width of the character and the thicknesses of adjusted X strokes;

means for executing a program routine to adjust the Y coordinates of the frame points for each character of the typeface representative of Y strokes, said Y strokes being oriented in the horizontal direction and prioritized in order of visual importance to the character, said strokes being adjusted according to the prior wherein the amount or adjustment of the lower priority strokes is dependent upon the thicknesses of the higher priority strokes, said adjustment preserving the heights of the characters of the typeface and the horizontal alignment of the Y strokes; and means for executing a program routine to adjust the Y coordinates of the frame points which do not form a stroke, said adjustment dependent on preserving the height of the character and the thicknesses and the horizontal alignment of the adjusted strokes;

whereby the important visual features of the characters of the typeface are maintained thereby minimizing the visual degradation of the typeface.

6. The apparatus of claim 5 further comprises:

means for executing a program routine to determine diagonal strokes comprising each character which are oriented in the diagonal direction, said strokes formed by a plurality of frame points;

means for executing a program routine to determine the frame points of each character of the typeface representative of the diagonal strokes, said adjustment dependent on preserving the adjusted thicknesses and locations of the adjusted X and Y strokes.

7. The apparatus of claim 5 wherein the program routine executed to form frame forms the frame in such a manner that there is a straight line segment for every horizontal tangent, vertical tangent, straight line segment, tangent of an inflection point and tangents at a slope discontinuity, said segments connected by straight segments.

8. The apparatus of claim 5 wherein the program routine executed to adjust the X coordinates of the frame points which do not form a stroke comprises a program subroutine for aligning each X coordinate with the closest side of a main street stroke and rounding the coordinate value of the nearest grid position.

* * * * *

UNITED STATES PATENT AND TRADEMARK OFFICE
CERTIFICATE OF CORRECTION

PATENT NO.    : 5,319,358
DATED         : June 7, 1994
INVENTOR(S)   : Martinez et al.

It is certified that error appears in the above-identified patent and that said Letters Patent is hereby corrected as shown below:

In column 27, claim 1 at lines 40-41, please delete " generated for a particular scale and each character of the typeface is ".

In column 27, claim 1 at line 62, please delete " and adjustment " and insert -- said adjustment --.

In column 28, claim 1 at line 6, please delete " thepriority " and insert -- the priority --.

In column 28, claim 3 at line 34, please delete " weight " and insert -- straight --.

Signed and Sealed this

Thirtieth Day of December, 1997

Attest:

Attesting Officer

BRUCE LEHMAN

*Commissioner of Patents and Trademarks*